United States Patent [19]

Yokosawa

[11] Patent Number: 4,875,115

[45] Date of Patent: Oct. 17, 1989

[54] DIGITAL SIGNAL TAPE RECORDING/REPRODUCING APPARATUS WITH IMPROVED SERVO CONTROL

[75] Inventor: Seiichi Yokosawa, Saitama, Japan

[73] Assignee: Pioneer Electronic Corporation, Tokyo, Japan

[21] Appl. No.: 93,470

[22] Filed: Sep. 8, 1987

[30] Foreign Application Priority Data

Sep. 5, 1986 [JP] Japan ................................ 61-208055
Sep. 5, 1986 [JP] Japan ................................ 61-208056

[51] Int. Cl.$^4$ ..................... G11B 5/584; G11B 15/467
[52] U.S. Cl. ................................. 360/77.15; 360/18; 360/27; 360/32; 360/77.14; 360/70
[58] Field of Search ............... 360/77, 18, 32, 19.1, 360/27, 48, 73, 70, 73.04, 73.05–73.12, 77.13–77.15

[56] References Cited

U.S. PATENT DOCUMENTS 4,656,539 4/1987 Sugiki et al. ........................ 360/77
4,714,971 12/1987 Sigiki et al. ........................ 360/77
4,739,420 4/1988 Odaka et al. ....................... 360/77
4,755,893 7/1988 Yamada et al. ..................... 360/77

Primary Examiner—Alan Faber
Assistant Examiner—Steven R. Garland
Attorney, Agent, or Firm—Sughrue, Mion, Zinn, Macpeak & Seas

[57] ABSTRACT

A digital signal reproducing apparatus which reproduces digital PCM audio signals recorded on a recording medium in the form of single helical tracks. The apparatus is provided with at least two rotary heads for reproducing signals on the recording medium. The apparatus, however, is not provided with an erase head. Previously recorded signals are erased by overwriting, as a result of which a problem may arise in which a sync signal remains unerased. Therefore, a level of a pilot signal frequency component sampled in response to the sync signal is compared with a predetermined level to see if the sampled level is appropriate. It it is not appropriate, capstan servo control is not performed.

4 Claims, 13 Drawing Sheets

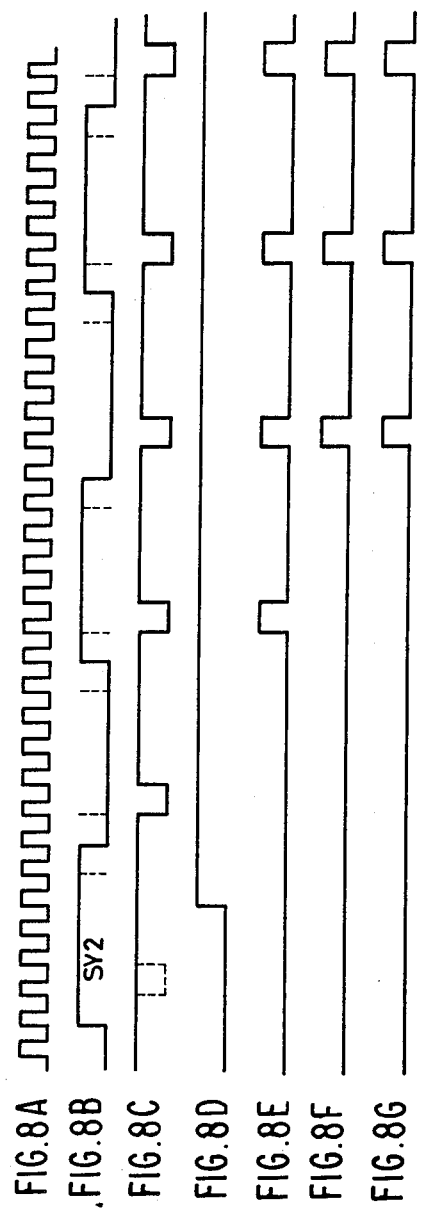
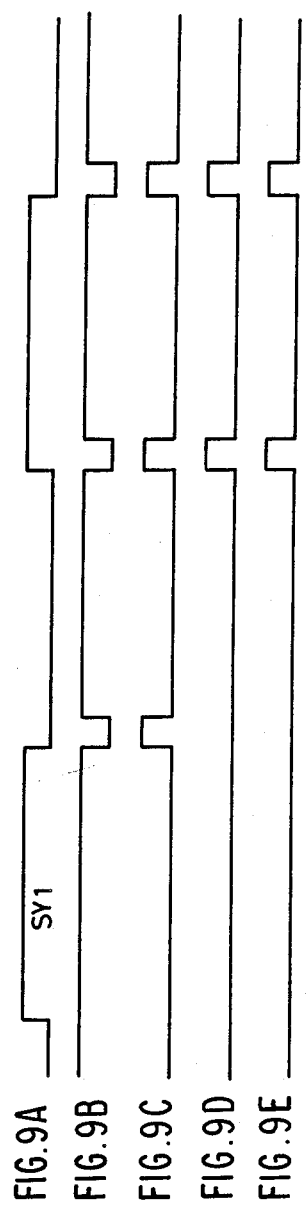

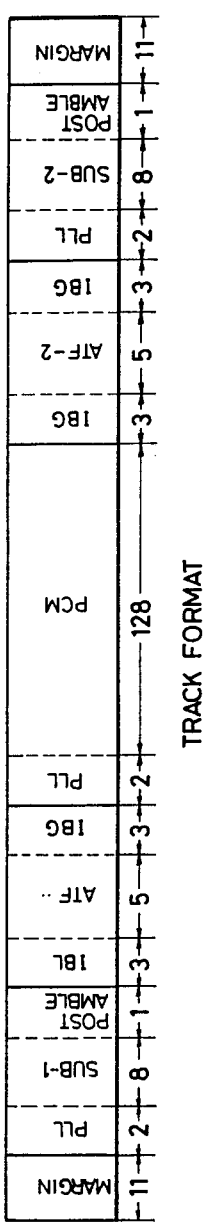
FIG. 14A TRACK FORMAT
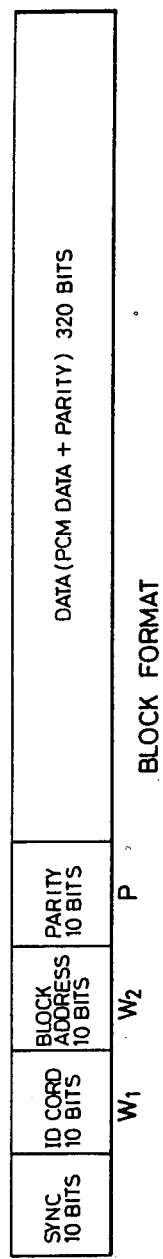
FIG. 14B BLOCK FORMAT
FIG. 16A
FIG. 16B
FIG. 16C

DIGITAL SIGNAL TAPE RECORDING/REPRODUCING APPARATUS WITH IMPROVED SERVO CONTROL

BACKGROUND OF THE INVENTION

The present invention relates to a digital signal reproducing apparatus suitable for reproducing digital PCM audio signals that have been recorded in the form of single helical tracks on a recording medium, one track being formed per unit time, with a rotary head.

A technique is known in which audio signals are recorded on magnetic tape in the form of helical tracks by helical scanning with a rotary head, one track being formed per unit time, and being reproduced subsequently. A digital signal recording/reproducing apparatus known as an R-DAT (rotary head type digital audio tape recorder) has been designated for recording audio signals as PCM signals and subsequently reproducing the same.

One recorded track format in an actual R-DAT system is shown in FIG. 14A, in which each of MARGIN, PLL and POSTAMBLE has a frequency of $\frac{1}{2} f_m$ ($f_m = 9.4$ MHz) and IBG has a frequency of $1/6 f_m$. Each of SUB and PCM is composed of a plurality of blocks, as shown in FIG. 14B. SYNC is composed of 10 bits, of which 9 bits are fixed, with the remainder assuming various patterns depending upon the pace and audio signals. SUB consists of a cyclic pattern of 8 such blocks, and PCM has 128 blocks. The numerals given in FIG. 14A represent the numbers of blocks occupied by the respective regions. The regions ATF-1 (between SUB-1 and PCM) and ATF-2 (between PCM and SUB-2) (ATF=automatic track finding) are provided to ensure that tracking control, i.e., control for allowing a rotary head to correctly scan the recorded tracks during reproduction, can be accomplished by means of the output of the head itself without employing any special head.

In R-DAT, time base compressed PCM signals are recorded in the form of helical tracks on magnetic tape by means of two rotary heads. Instead of providing a guard band between adjacent tracks, a tracking pilot signal is recorded both at the beginning and at the end of each track in a region independent of the area in which the PCM signals are recorded. During reproduction, the recorded tracks are scanned with a rotary head having a scanning width larger than the width of each track, and the output of the reproduced pilot signals from the two tracks adjacent to the track being scanned is used to control the tracking of the rotary head.

The ATF track pattern is shown in FIG. 15 and is hereinafter described with reference to the case of a drum having a diameter of 30 mm which is rotating at 2,000 rpm with the tape wound at an angle of 90° with respect to the drum.

ATF-1 and ATF-2, located respectively in the front and rear portions of each track, have a small azimuth effect signal $f_1$ having a low frequency of 130 kHz ($= f_m/72$) as a tracking pilot signal. This signal is used to detect the levels of crosstalk resulting from the two tracks adjacent to the track being reproduced, so as to obtain the difference between the levels of such crosstalk as a tracking error signal.

In each of ATF-1 and ATF-2 there is recorded a sync signal for identifying the location at which the pilot signal $f_1$ is recorded. In the presence of crosstalk, the sync signal is unable to distinguish the current track from adjacent tracks, so it is selected in such a way that it not only has a frequency capable of producing an azimuth-effect but also affords a pattern different from that of the PCM signal. If the head having a + (plus) azimuth is designated A and the head having a − (minus) azimuth is designated as B, two different sync signals are provided to distinguish head A from head B. Stated more specifically, a sync 1 signal $f_2$ having a frequency of $f_m/18$ ($= 522$ kHz) and a sync 2 signal $f_3$ having a frequency of $f_m/12$ ($= 784$ kHz), respectively corresponding to head A and B, are recorded in predetermined positions.

In an R-DAT which does not employ an erase head, a new signal is written over the previously recorded signal. In order to enable this "overwrite" mode, an erase signal $f_4$ having a frequency of $f_m/6$ ($= 1.56$ MHz) is recorded at a predetermined position to erase the previously recorded pilot signal $f_1$, sync 1 signal $f_2$, and sync 2 signal $f_3$.

The ATF pilot signals are located at different positions on the current track and the two adjacent tracks. The level of the pilot signal on the current track (i.e., the track being scanned) differs on a time basis from the level of each of the pilot signals on the adjacent tracks, so that the three different levels can be sampled independently of each other.

Five blocks are assigned to each of the ATF regions, ATF-1 and ATF-2, and the pilot signal $f_1$ is recorded in two of these blocks. The sync signal $f_2$ is recorded in an area covering 1 or 0.5 block from the center of the position in which one of the two other adjacent tracks is recorded. The pilot signal $f_1$ on the other adjacent track is recorded in such a way that its center is positioned two blocks after the beginning of the sync signal recorded on the current track. A one-block sync signal is assigned to an odd-number frame, and a half-block sync signal is assigned to an even-number frame.

As described above, the sync signals to be recorded in the ATF region have different frequencies depending upon which head is used in scanning, and these sync signals also have different recording lengths in odd-number frames and even-number frames. This design enables four consecutive tracks to be distinguished from one another since they are provided with different ATF regions. Thus, the pattern of ATF regions is of the 4-track completed type, being cyclically repeated every 4 tracks.

When magnetic tape in which signals have been recorded in the format shown in FIG. 14A is played back with a rotary head, an RF signal of the type shown in FIG. 16A is reproduced from the head. If this RF signal is obtained by playback of a track with the odd-number frame (A) shown in FIG. 15, it may be passed through a bandpass filter (BPF) of 130 KHz so as to obtain a pilot signal $f_1$ as shown in FIG. 16B.

The signal in zone I is due to the pilot signal on the current track, and those in zones II and III result from crosstalk of the pilot signal on a track with the odd-number frame (B) and a track with the even-number frame (B), respectively. If the rotary head were scanning the current track correctly, the envelope levels of zones II and II, or the values of $V_{II}$ and $V_{III}$ indicated in FIG. 16C should be equal to each other. However, if a tracking deviation occurs, $V_{II}$ is not equal to $V_{III}$ ($V_{II} \neq V_{III}$), and the amount and direction of the deviation of the rotary head with respect to the current track can be determined by the magnitude and polarity of the difference between $V_{II}$ and $V_{III}$. Therefore, by actuating a capstan servo according to the difference between $V_{II}$ and $V_{III}$ so as to effect fine adjustment of the tape speed, the rotary head can be controlled to travel correctly on the current track.

However, as described before, R-DAT does not employ an erase head, and subsequent recording is carried out by overwriting. Therefore, it is sometimes not possible to generate a correct error signal upon correct detection of the sync signal and sampling of the value $V_{II}$ and $V_{III}$.

Specifically, in R-DAT, recording may be performed with the range of ± two blocks from the center of the PCM region. Further, pilot signal $f_1$ (=130 kHz) is recorded at a level slightly lower than the recording levels of the reminder signals. This is done in order to have the previously recorded pilot signal erase by the erasing signal, since the signal having a lower frequency is recorded on the tape with a deeper recording level. However, with the pilot signal $f_1$ having a lower recording level, the previously recorded sync signal tends to remain unerased when the pilot signal $f_1$ is newly recorded in place of the sync signals $f_2$ and $f_3$ which have previously been recorded.

More specifically, when new recording is carried out with a displacement in the forward direction with respect to the previous recording, there is no problem, since the sync signal of the new recording always precedes the sync signal of the previous recording which has remained unerased. However, a problem will be caused in the case in which the sync signals of the new recording are displaced in the backward direction and the unerased sync signal precedes the new sync signal. An example of such a problem is that the displacement occurs in the backward direction by an amount in the range of one to two blocks. Partial or entire sync signals $f_2$ and $f_3$ which previously have been recorded remain unerased in the portion of the pilot signal $f_1$ in even-number frame (A) and odd-number frame (A) with respect to ATF-1 and in even-number frame (B) and odd-number frame (B) with respect to ATF-2.

If such a problem occurred, sampling would be implemented to sample a level of a frequency component of the pilot signal contained in the reproduced RF signal in response to the previously recorded sync signal. This pilot signal should have been at a crosstalk level of the sampling signal in one adjacent track. However, the sampled frequency component actually is that of the pilot signal of the current track, and the level obtained by sampling is extremely large. Thereafter, the frequency component of the pilot signal contained in the reproduced RF signal coming after two blocks is sampled, the difference in level of this sampled value and the sampled value obtained two blocks before is computed, and the capstan servo is controlled in accordance with this level difference as the amount of track deviation. However, since the previously sampled value is not the crosstalk level of the adjacent track but the level of the current track, an extremely large level difference compared with the actual track deviation is obtained. When such a phenomenon occurs, the capstan servo is disturbed and the tape travel is badly affected.

Although description has been provided for the case in which the previous sync signal remains unerased in the portion of the pilot signal which has been newly recorded, the sync signal may otherwise remain as noise as a result of incomplete erasure of the sync signal by the erase signal.

SUMMARY OF THE INVENTION

The present invention has been made in view of the foregoing deficiencies, and thus it is an object of the invention to provide a digital signal reproducing apparatus which does not operate erroneously even if the previously recorded sync signal remains unerased as a result of erasure through overwriting.

It is another object of the present invention to provide a digital signal reproducing apparatus which is capable of performing stable capstan servo control in response to crosstalk difference between the pilot signals on two adjacent tracks as obtained by the respective rotary heads.

It is still another object of the present invention to provide a digital signal reproducing apparatus in which tracking control can be correctly carried out even if a previously recorded sync signal remains unerased as a result of being overwritten. Further, in accordance with the present invention, when it is judged that the levels of the pilot signal frequency components which are the outputs of the respective rotary heads are not in a particular relationship with respect to a predetermined level, detection of the sync signal is prohibited so as to not to cause erroneous capstan servo control because of the difference in level between the pilot signal on the current track and the signal detected after a predetermined period of time.

BRIEF DESCRIPTION OF THE DRAWINGS

FIGS. 8A–8G and 9A–9E are timing charts showing the waveforms of signals generated in various parts of the system shown in FIG. 7;

FIGS. 14A and 14B show a track format and a block format used in R-DAT;

FIGS. 16A–16C are diagrams illustrating the principle of tracking control with the track pattern shown in FIG. 15.

DETAILED DESCRIPTION OF THE PREFERRED EMBODIMENT

One preferred embodiment of the present invention now will be described with reference to the accompanying drawings.

Figure 1:
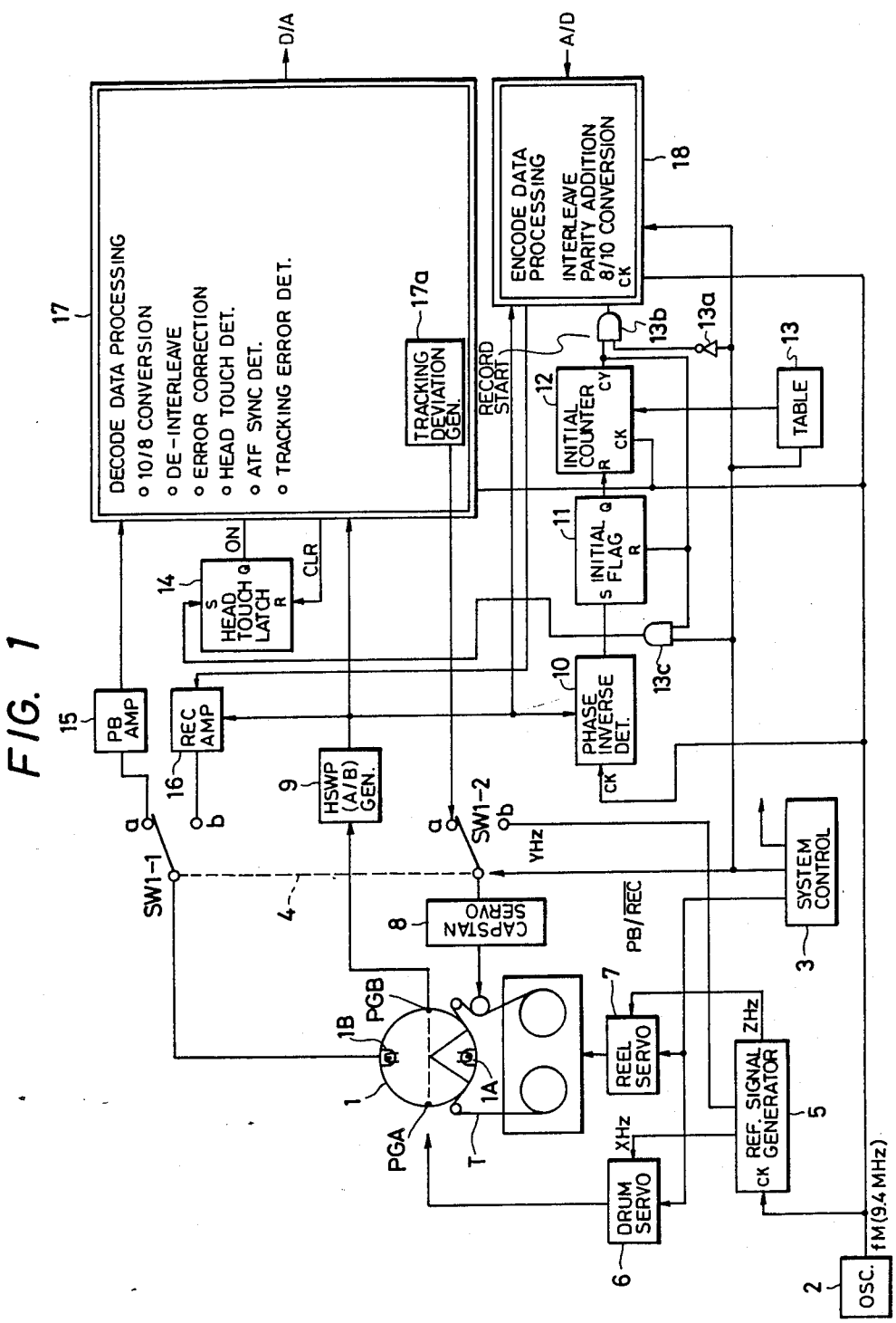
FIG. 1 is a system block diagram showing the general layout of a digital signal reproducing apparatus according to one embodiment of the present invention.

FIG. 1 is a system block diagram showing a digital signal recording/reproducing apparatus according to one embodiment of the present invention. In the figure, a rotary drum 1 has a diameter of 30 mm and is equipped with two rotary heads 1A and 1B spaced apart by 180°, head 1A recording and reproducing (+) azimuth and head 1B recording and reproducing (−) azimuth. Pulse generators (PG) PGA and PGB are provided diametrically opposite positions midway between the heads 1A and 1B.

A crystal oscillator 2 generates a basic clock $f_m$ having a frequency of 9.4 MHz, with the basic clock $f_m$ being supplied to various parts of the system. A system controller 3 outputs a PB/REC signal for performing such operations as on-off control on a toggle switch unit 4 composed of switches SW1 and SW2. A reference signal generator 5, in response to the basic clock $f_m$ fed to its CK input, generates reference signals having frequencies of X Hz (66 Hz assuming the use of 2 PGs), Y Hz (which varies according to the number of FGs in the capstan motor), and Z Hz.

A drum servo 6 is controlled by system controller 3 and, in response to the reference signal X Hz, performs servo control on the rotation of a drum motor. A reel servo 7 also is controlled by the system controller 3 and, in response to the reference signal Z Hz, performs servo control on the rotation of a reel motor. A capstan servo 8 also is controlled by the system controller 3 and performs servo control on the rotation of a capstan motor either in response to the reference signal Y Hz in a recording mode where the switch 4 is placed on the side of contact b or on the basis of the amount of tracking deviation in a playback mode where the switch 4 is on the side of contact a.

An HSWP (A/B) signal generator 9, in response to the pulses from the two PGs on the drum 1, generates an HSWP (A/B) signal for switching A head 1A to B head 1B and vice versa. The HSWP (A/B) signal, which assumes a high (H) level when A head is scanning and a low level (L) when B head is scanning is supplied to various parts of the system.

A phase inversion detector circuit 10 receives the basic clock $f_m$ (fed to CK input) and HSWP (A/B) as inputs and produces an output that is supplied to the S input of an initial flag latch 11. The initial flag latch 11 receives at its R input a CY output from an initial counter 12; the Q output of the latch 11 is supplied to the R input of the initial counter 12.

A table 13 outputs a threshold value to the initial counter 12 under the control of the PB/REC signal issued from the system controller 3. The CY output of the initial counter 12 becomes high (H) in accordance with the count of the set value. The CY output is applied to the encoding data processing unit 18 via the AND gate 13b which is enabled or disabled in response to the PB/REC signal applied to the AND gate 13b via the inverter 13a. The CY output of the initial counter 12 is further applied to the S input of the head touch window flag latch 14 via the AND gate 13c which is enabled or disabled in response to the PB/REC signal.

The head touch window flag latch 14 generates a window for prohibiting the detection of head touch as long as noise is produced when head switching is effected. The Q output of the latch 14 is fed as an ON signal into a decoding data processing unit 17 and the R input of the latch 14 is fed with a clear signal from the unit 17.

A reproducing amplifier 15 amplifies the signals from rotary heads 1A and 1B which send the amplified signals to the decoding data processing unit 17 to be described below. A recording amplifier, in response to the HSWP (A/B) signal, receives data to be recorded from the encoding data processing unit 18 (to be described below) and supplied it to the rotary heads 1A and 1B via switch SW1.

The decoding data processing unit 17 extracts data from the RF signal from the reproducing amplifier 15 and sends it to a D/A converter unit after performing the necessary operations such as 10/8 conversion (demodulation), de-interleaving, and error correction. At the same time, the unit 17 performs other operations, such as head touch detection, ATF sync detection and tracking error detection, on the extracted data and supplies error signals to the capstan servo 8 from a tracking deviation signal generator section 17a.

The encoding data processing unit 18 performs the necessary processing operations on A/D converted data such as interleaving, parity addition, 8/10 conversion and ATF signal addition, and supplies the processed data to the recording amplifier 16.

The system having the above-described configuration performs a recording operation when the PB/REC signal from the system controller 3 is at a low (L) level. When the PB/REC signal is "L", switch 4 is placed on the side of contact b and the capstan servo 8 is supplied with the reference signal Y Hz from the reference signal generator 5, whereupon capstan servo as referenced to the signal Y Hz is actuated to perform tracking control.

As the drum 1 rotates, PGA and PGB generate pulses and in response to these pulses, the HSWP (A/B) generator 9 produces an HSWP (A/B) output signal which assumes a "H" level when A head 1A is scanning and a "L" level when B head 1B is scanning. The HSWP (A/B) signal is fed into the phase inversion detector circuit 10 and when the level of this signal changes, or when the circuit 10 has detected a head change, its output is maintained at a "H" level for one basic clock pulse period.

When the output of the phase inversion detector circuit 10 has risen from a "L" to "H" level, the initial flag latch 11 is set and its Q output becomes high, whereupon the initial counter 12 starts a counting operation. In the embodiment under discussion, the counter 12 counts the number of basic clocks $f_m$ corresponding to a given period equivalent to 3.75 ms in response to a set value supplied from a table 13, when the CY output of the counter rises to reset the initial flag latch 11 while at the same time, the high CY output is applied to the encoding data processing unit 18 as a recording start signal. In response to this recording start signal, the encoding data processing unit 18 produces data to be recorded in a predetermined format.

When the PB/REC signal from the system controller 3 is at a high (H) level, the switch 4 is placed on the side of contact a and the rotary heads 1A and 1B are connected to the reproducing amplifier 15 while the RF signal is fed to the decoding data processing unit 17.

The operation of the capstan servo 8 is referenced to the amount of tracking deviation supplied from the decoding data processing unit 17. The amount of tracking deviation is an ATF error signal that is associated with the difference between the levels of amplitude of crosstalk of pilot signals from the two tracks adjacent to the track being scanned. The details of this signal will be given later in this specification.

The HSWP (A/B) signal generator 9 and the phase inversion detector circuit 10 will operate in a playback mode in the same manner as in a recording mode. The initial counter 12 operates as a playback mode counter in response to the set value supplied from the table 13, in which the level of the CY output of the counter 12 becomes high when the counts become equivalent to a certain value, say, 100 $\mu$s/1 ms. This is in order to ensure that the head touch operation to be described later in this specification will be prohibited as long as noise is produced when a head change is effected. It also is to ensure that, after the lapse of the given period specified above, the high CY output is sent through and AND gate 13c to the head touch window flag latch 14, which then is set to bring its Q output to a high level and to produce an ON signal for head touch detection. In response to the ON signal from the latch 14, the decoding data processing unit 17 detects the occurrence of a head touch, or the generation of an RF signal upon contact between tap T and head 1A or 1B, and as a result of this detection, the head touch window flag latch 14 is cleared and the ON signal returns to a low level.

Figure 2:
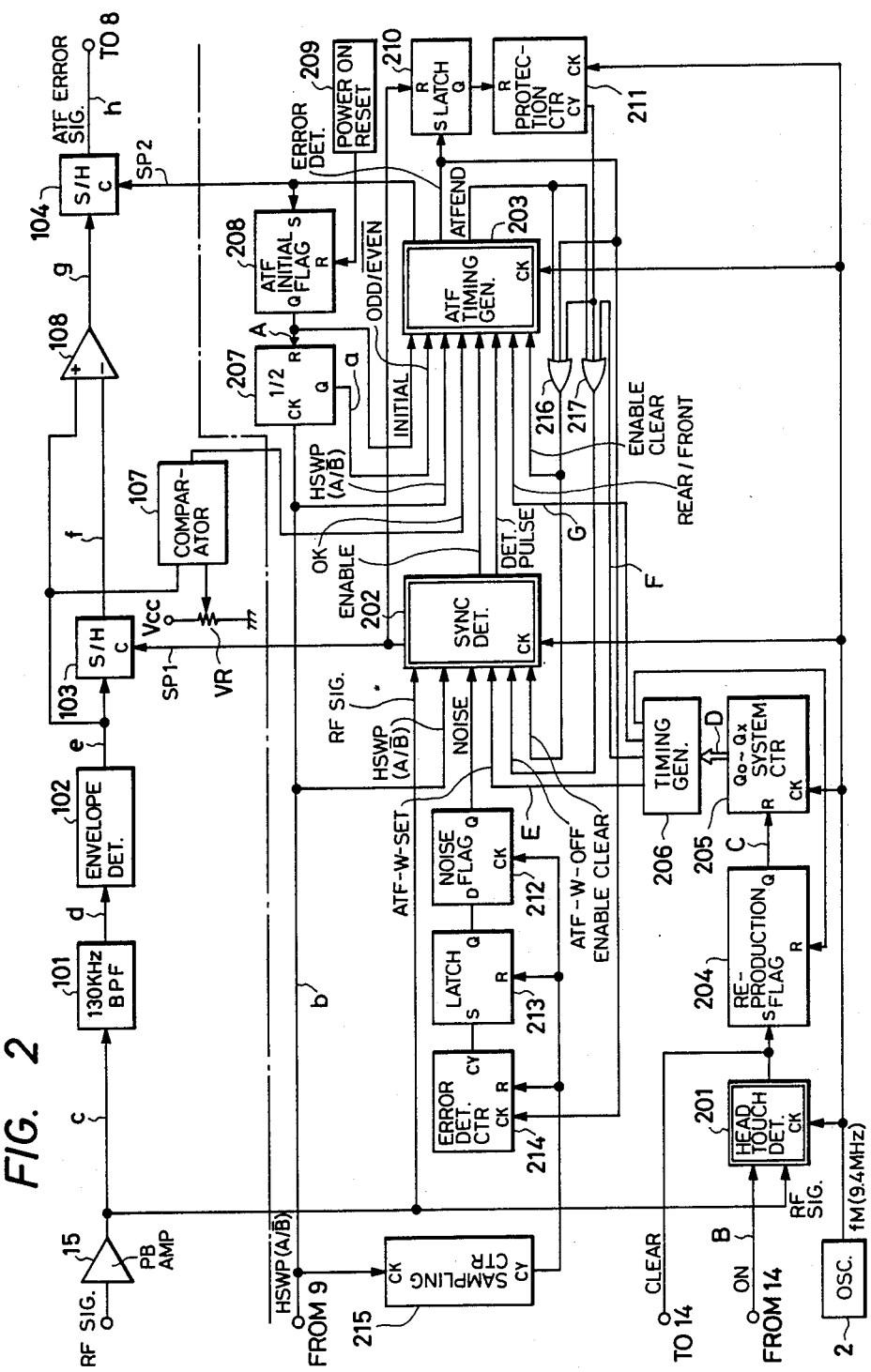
FIG. 2 is a block diagram showing the essential parts of the apparatus of the present invention.

The details of the portion of the decoding data processing unit 17 which is specifically related to tracking control are hereinafter described with reference to a block diagram shown in FIG. 2. The circuit shown in FIG. 2 is roughly divided into two portions, an analog portion that is shown above the one-short-and-one-long dashed line and digital portion shown below that line. The analog portion is composed of the reproducing amplifier 15, a bandpass filter (BPF) 101, an envelope detector 102, a first sample-and-hold (S/H) circuit 103, a second S/H circuit 104, a comparator 107, a differential amplifier 108, and a half-fixed resistor VR.

The digital portion is composed of the crystal oscillator 2, a head touch detector circuit 201, a sync detector circuit 202, an ATF timing generator 203, a reproducing flag latch 204, a system counter 205, a timing generator 206, a half-frequency divider 207, an ATF initial flag latch 208, a power-on reset circuit 209, a latch circuit 210, a protective counter 211, noise flag latch 212, a latch 213, an error detection counter 214, a sampling counter 215, and OR gates 216 and 217.

The analog portion is first described. The reproducing amplifier 15 receives at its input a RF signal from the rotary heads 1A and 1B (FIG. 1) and the output of the amplifier is supplied to the BPF 101, head touch detector circuit 201, and the sync detector circuit 202.

The BPF 101 transmits only the 130 kHz component of the RF signal and supplies it to the envelope detector 102, which performs envelope detection on the 130 kHz component and applies its output to the input of the S/H circuit 103, the (+) input of the differential amplifier 108, and another input of the comparator 107.

The S/H circuit 103 samples and holds the output of the envelope detector 102 in response to a sampling signal SP 1 that is applied to its C input from the sync detector circuit 202. That held output thereafter is applied to the (−) input of the differential amplifier 108. What is sampled and held by the S/H circuit 103 is the DC level of crosstalk of the pilot signal from one of the two tracks adjacent to the track being scanned. The output of the envelope detector 102 also passes to an input of the comparator 107.

The S/H circuit 104 receives at its input the output signal g from a differential amplifier 108. This signal g is sampled and held by the circuit 104 in response to a sampling signal SP 2 from the ATF timing generator 203, and thereafter is supplied to the capstan servo 8 (FIG. 1) as an ATF error signal which indicates the difference between the DC levels of crosstalk from the two adjacent tracks.

The differential amplifier 108 determines the difference between the output of the envelope detector 102 applied to its (+) input and the output of the S/H circuit 103 applied to its (−) input and feeds the difference of the S/H circuit 104. In other words, when the envelope detector 102 produces as its output the DC level of crosstalk from the other adjacent track, the amplifier 108 produces as its output the amount of tracking deviation, or the difference between the levels of crosstalk from the two adjacent tracks.

The digital portion of the circuit shown in FIG. 2 now will be described. Upon receiving an ON signal from the head touch window flag latch 14 (FIG. 1) and the basic clock $f_m$, the head touch detector circuit 201 detects the reception of an ATF signal and supplies a signal to the S input of the reproduction flag latch 204. The details of this operation will be shown later in this specification.

The sync detector circuit 202 receives at its inputs the RF signal, the HSWP (A/B) signal, an ATF window set signal from the timing generator 206, an ATF window off signal from the OR gate 217, a noise signal from the noise flag latch 212, the basic clock $f_m$ from the crystal oscillator 2, and an enable clear signal from the OR gate 216, and produces a sampling signal SP1, an enable signal and a detection pulse signals its outputs. The sampling signal SP1 is sent to the C input of the S/H circuit 103 and to the R input of the latch 210. Each of the enable signal and the detection pulse signal is sent to the ATF timing generator circuit 203. After converting the RF signal to a digital signal, the sync detector circuit 202 detects the beginning of the sync pattern SY1 of rotary head 1A and that of the sync pattern SY2 of rotary head 1B so as to produce a sampling signal SP1 as an output, and thereafter outputs detection pulse signals in response to sequentially detected sync signals. The details of the operation of the sync detector circuit 202 also will be given later in this specification.

The ATF timing generator 203 receives at its inputs the OK signal from the comparator 107, an ODD-/EVEN signal coming from the Q output of the half-frequency divider 207, an initial signal coming from the Q output of the ATF initial flag latch 208, an enable signal and a detection pulse signal from the sync detector circuit 202, a rear/front signal from the timing generator 206, an enable clear signal from the OR gate 216, and the basic clock $f_m$ from the crystal oscillator 2, and produces sampling signals SP2, an error detection signal, and an ATF END signal at its outputs. The sampling signal SP2 is fed to the C input of the S/H circuit 104 and to the S input of the ATF initial flag latch 208; the error detection signal is fed to the S input of latch 210, to one output of the OR gate 216, and to the CK input of the error detection counter 214; and an ATF END signal is fed to one input of each of the OR gates 216 and 217.

The ATF timing generator 203 receives an enable signal from the sync detector circuit 202 and when the level of said signal is high, a timer counter (not shown) for timing generation is enabled. At the same time, the generator 203 receives a detection pulse signal from the sync detector circuit 202, and when the number of detection pulses counted within a specified time exceeds a specified value, the generator 203 outputs an error detection signal when the detection pulse counts are below the specified value or if the OK signal coming from the comparator 107 is at a low (L) level. The details of the operation of the ATF timing generator 203 will also be described later in this specification.

For producing the basic clock $f_m$, the crystal oscillator 2 oscillates at 9.4 MHz which is the rate of transmission of channel bit data by an R-DAT. The basic clock $f_m$ produced by the oscillator 2 is applied to the CK input of each of the head touch detector circuit 201, sync detector circuit 202, ATF timing generator 203, system counter 205, and the protective counter 211.

Each of the latches 204, 208, 210 and 313 is composed of an R-S flip-flop whose Q output becomes high in response to the rising edge of its S input and becomes low in response to the rising edge of its R input.

The reproduction flag latch 204 receives the output of the head touch detector circuit 201 and an END signal from the timing generator 206 at the S and R inputs, respectively, and the Q output of the latch 204 is supplied to the R input of the system counter 205. The system is in a relay mode when the Q output of the latch 204 is at a high level.

The system counter 205 receives the Q output of the reproduction flag latch 204 and the basic clock $f_m$ at the R and CK inputs, respectively, and the outputs $Q_0$-$Q_x$ of the counter 205 are fed into the timing generator 206. The function of the system counter 205 is to indicate the approximate positions at which various signals are recorded on the tracks.

In response to the $Q_1$-$Q_x$ outputs from the system counter 205, the timing generator 206 generates an ATF window set signal, a rear/front signal, a window clear signal and an END signal at its outputs. The ATF window set signal is supplied to the sync detector circuit 202, the rear/front signal to the ATF timing generator 203, the window clear signal to the OR gate 217, and the END signal to the R input of the reproduction flag latch 204. The timing generator 206 decodes the outputs of the system counter 205 and generates the necessary timing signals for various parts of the system.

The half-frequency divider 207 receives an HSWP (A/B) signal at the CK input and halves its frequency to produce an ODD/EVEN signal at the Q output, which is supplied to the ATF timing generator 203. The R input of the half-frequency divider 207 is fed with the Q output of the ATF initial flag latch 208.

The ATF initial flag latch 208 receives a sampling signal SP2 from the ATF timing generator 203 at the S input and a signal from the power-on reset circuit 209 at the R input. The Q output of the latch 208 is fed to the R input of the half-frequency divider 207 and to the ATF timing generator 203. The ATF initial flag latch 208 generates a flag indicating the application of capstan servo by ATF.

The power-on reset circuit 209 produces a high (H) output when power is on. The latch 210 receives an error detection signal from the ATF timing generator 203 as its S input, and a sampling signal SP1 from the sync detector circuit 202 at its R input. The Q output of the latch 210 is fed to the R input of the protective counter 211. The Q output of the latch 210 becomes high when it detects an error and is reset in response to the reception of a sampling signal SP1.

The protective counter 211 performs counting for a given period after error detection; only when its R input is at a high level does the counter 211 counts the number of basic clocks $f_m$ applied to the CK input, and the counter is cleared when the level of the R input becomes low. The R input of the counter 211 is fed with the Q output of the latch 210, and its CY output is fed to an input of the OR gate 217.

The noise flag latch 212 stores temporarily the result of checking to whether the system is noisy in a replay mode. The latch 212 is composed of a D flip-flop, in which the D input is fed with the Q output of the latch 213 and the CK input with the CY output of the sampling counter 215, with the Q output being supplied as a noise signal to the sync detector circuit 202.

The latch 213 receives the CY output of the error detection counter 214 at its S input, and the CY output of the sampling counter 215 at its R input, with the Q output being supplied to the D input of the noise flag latch 212.

The error detection counter 214 receives the error detection signal from the ATF timing generator 203 at its CK input, and the CY output of the sampling counter 215 at its R input, with the CY output of the counter 214 being supplied to the S input of the latch 213. The counter 214 counts the number of times the sampling signal SP1 was detected erroneously in a given period, and when the number exceeds a predetermined value, the CY output of the counter 214 becomes high.

The sampling counter 215 receives an HSWP (A/B) signal at its CK input, and its CY output is supplied to each of the R input of the error detection counter 214, the R input of the latch 213, and the CK input of the noise flag latch 212.

The OR gate 216 is fed with the error detection signal and ATF END signal from the ATF timing generator 203, as well as the CY output of the protective counter 211. The gate produces as its output an enable clear signal which is sent to both the sync detector circuit 202 and the ATF timing generator 203.

The OR gate 217 receives at its three inputs a window clear signal from the timing generator 206, an ATF END signal from the ATF timing generator 203, and the CY output from the protective counter 211, and produces at its output an ATF window off signal which is sent to the sync detector circuit 202.

In the system having the configuration described above, the reproduced RF signal is supplied through the reproduction amplifier 15 to the head touch detector circuit 201 and sync detector circuit 202, as well as to the BPF 101 which transmits only the 130 kHz component of the RF signal. The amplitude level of the 130 kHz components is converted to a DC level in the envelope detector 102 and thereafter is applied to the input of the S/H circuits 103, and to the (+) input of the differential amplifier 108.

The envelope detector 102 outputs in order on a time basis the DC level of the amplitude of the crosstalk of a pilot signal from one adjacent track and that of the crosstalk of a pilot signal from the other adjacent track. The detector 102 also outputs the DC level of the amplitude of the pilot signal from the current track either before or after the pilot signals on the two adjacent tracks.

The S/H circuit 103 samples and holds the DC level of the pilot signal on one adjacent track at the timing determined by the sampling signal SP1 from the sync detector circuit 202. The sample-and-hold level of crosstalk from the one adjacent track is applied to one input of the differential amplifier 108. As mentioned above, the output of the envelope detector 102 goes to the other input of the differential amplifier 108.

When the level of the input that is supplied to the comparator 107 via the half-fixed register VR is higher than the input from the S/H circuit 103, the comparator 107 produces a high (H) OK signal, indicating that the level of crosstalk from one adjacent track has been sampled correctly. The opposite case indicates that the level of the current track has been sampled. Therefore, a low (L) OK signal produced by the comparator 107 indicates erroneous detection of the sync signal. The OK signal produced from the comparator 107 is supplied to the ATF timing generator 203.

When the envelope detector 102 outputs the DC level of the amplitude of crosstalk from the other adjacent track, the differential amplifier 108 receives at the (−) input the DC level of the amplitude of crosstalk from one adjacent track, thereby producing at its output the difference between the DC levels of crosstalk from the two adjacent tracks. The difference provided the amount of tracking deviation, which is fed to the input of the S/H circuit 104.

The S/H circuit 104 samples and holds an amount of deviation for the two adjacent tracks in response to the sampling signal SP2. The output of the S/H circuit 104 is supplied to the capstan servo 8.

FIGS. 3A-3H are timing charts that show the waveforms for the signals generated in various parts of the system as a result of the operations described above, with the individual waveforms being keyed to the symbols attached to the respective parts.

Figure 3:
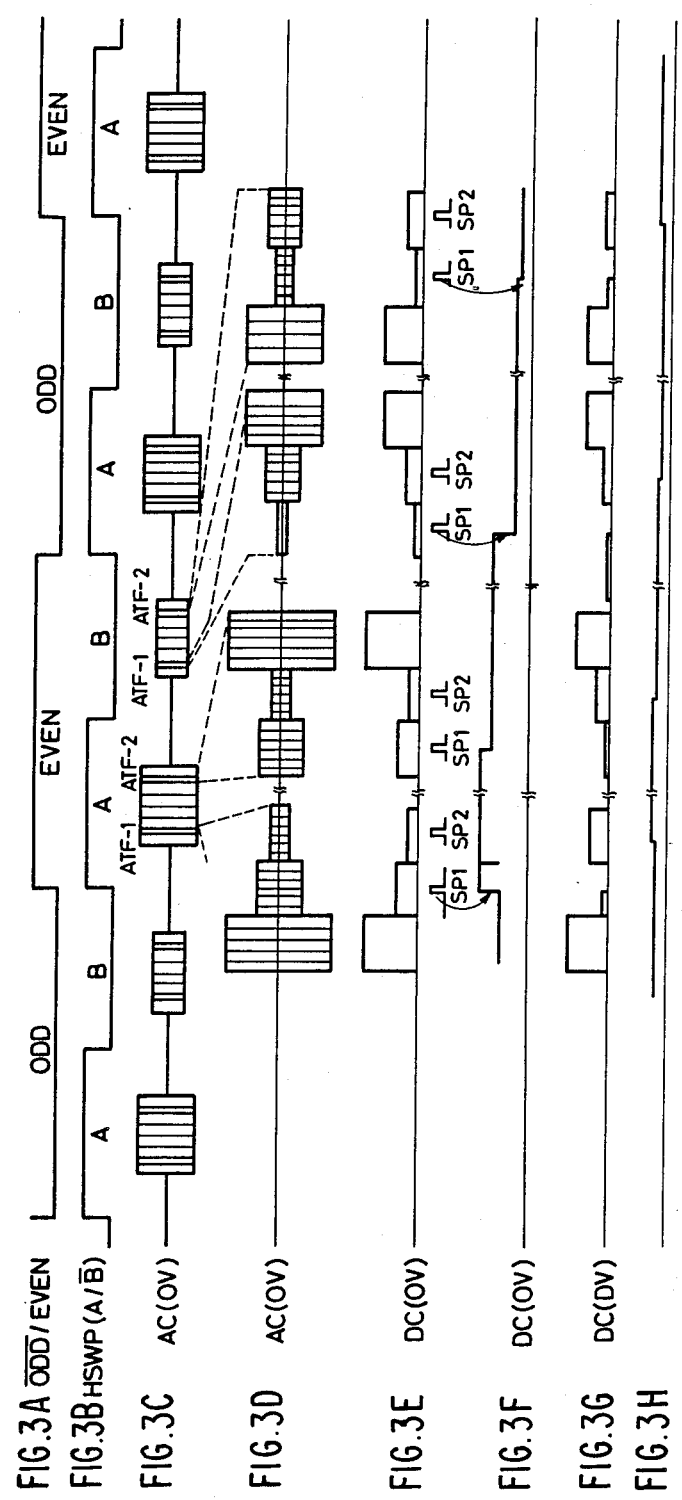
FIGS. 3A–3H, 4a–4c, and 4A–4G are timing charts showing the waveforms of signals generated in various parts of the system shown in FIG. 2.
Figure 4:
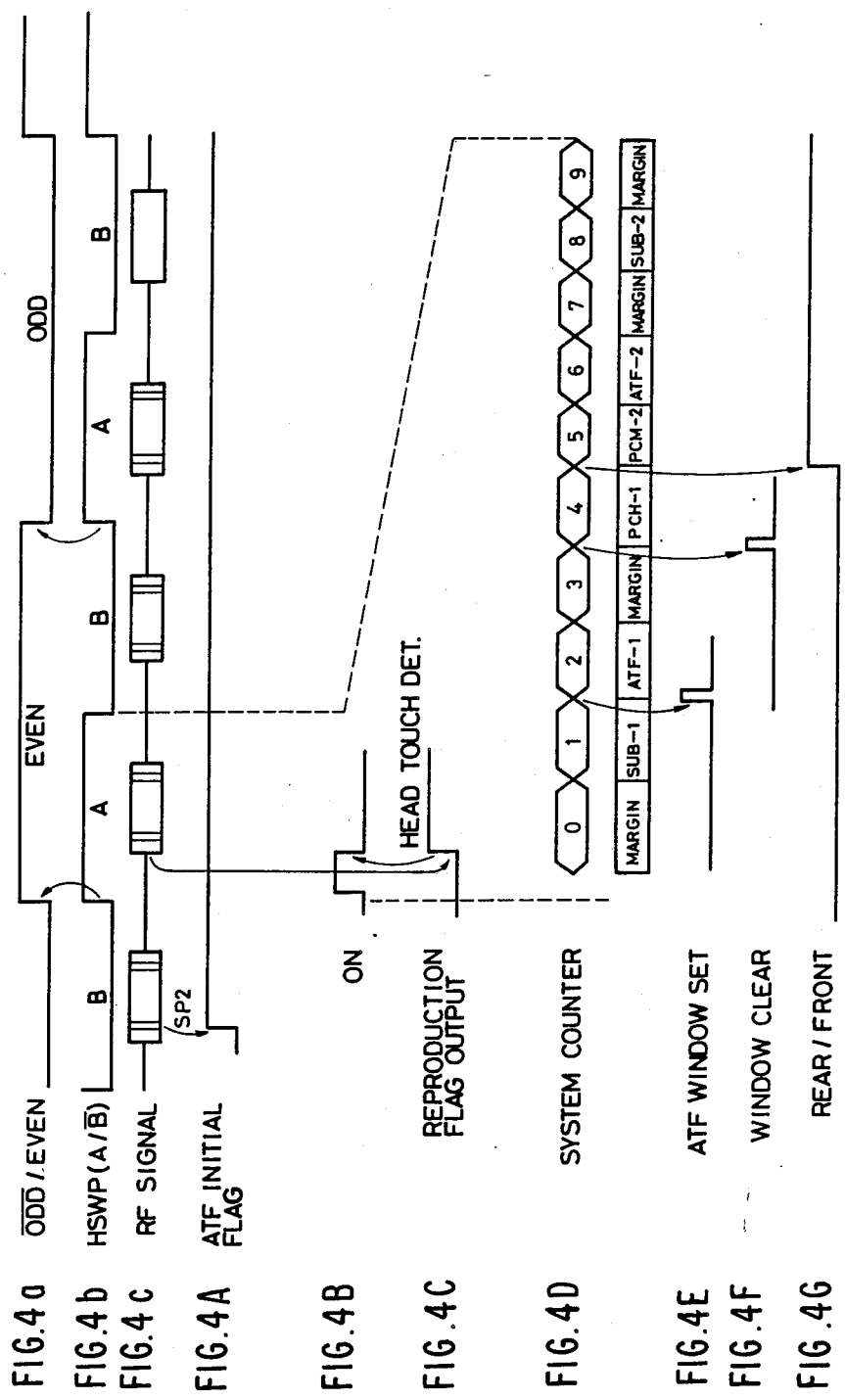

The level of the HSWP (A/B) signal whose waveform is depicted in FIG. 3B becomes high (H) when reproduction is achieved by A head 1A with (+) azimuth, and becomes low (L) when reproduction is made with BV head 1B having (−) azimuth. When there is a head change, the phase of the HWSP (A/B) signal is inverted. Upon phase inversion, the level of the Q output of the initial flag latch 11 (FIG. 1) becomes high and the initial counter 12 (FIG. 1) is actuated. The level of the CY output of the initial counter 12 becomes high when the tape passes a noisy portion, and as a result, the initial counter 12 sets the head touch window flag latch 14 (FIG. 1) and brings its Q output to a high level. When the level of the Q output of the latch 14 becomes high, the head touch detector circuit 201 is actuated.

When detecting the reproduction of RF signal due to contact between tape and head, the head touch detector circuit 201 produces a high (H) output, which sets the reproduction flag latch 204 and brings its Q output to a high level. When the level of the Q output of the latch 204 becomes high, the system counter 205 starts a counting operation. With this point of time being used as a reference, the system counter 205 allows estimation of the approximate positions at which the individual signals are recorded on the tape. In a response to $Q_0$-$Q_x$ outputs from the system counter 205, the timing generator 206 supplies the sync detector circuit 202 with an ATF window set signal a little before the positions at which ATF-1 and ATF-2 are recorded.

After converting the RF signal into a digital signal, the sync detector circuit 202 detects sync signal 1 (=$f_2$) generated when reproduction is achieved by A head 1A made with B head 1B. Detection of these sync signals by circuit 202 is based on the following relationship between frames and the patterns of the sync signals:

| Frame | $f_2(A)$ | $f_3(B)$ |
|---|---|---|
| ODD (1 block) | 20 waves/40 signals | 30 waves/60 signals |
| EVEN (0.5 block) | 10 waves/20 signals | 15 waves/30 signals |

When detecting three consecutive sync signals in a normal mode or four consecutive sync signals in a noisy mode, the sync detector circuit 202 outputs a sampling signal SP1 to the S/H circuit 103 so that it will sample and hold the level of crosstalk of the pilot signal $f_1$ from one adjacent track. At the same time, the sync detector circuit 202 supplies an enable signal to the ATF timing generator 203. Upon each detection of consecutive sync signals, the sync detector 202 supplied a pulse detection signal to the ATF timing generator 203.

In response to a high (H) enable signal from the sync detector circuit 202, the sync detection counter and timer in the ATF timing generator 203 will be actuated. At a time 0.25 blocks after the outputting of the sampling signal SP1 from the sync detector circuit 202, the ATF timing generator 203 checks to see if the crosstalk from adjacent tracks has been correctly sampled and held at the timing determined by the sampling signal SP1. Then, after 1.25 blocks, the timing generator 203 checks to see if the number of sync signals detected exceeds a specified value. If the result is affirmative, it is concluded that detection of sync signals has been effected correctly and after 2 blocks, the generator 203 supplies a sampling signal SP2 to the S/H circuit 104, which samples and holds the difference between the levels of crosstalk from the two adjacent tracks and supplies its output to the capstan servo 8 as the amount of tracking deviation.

If the above sequence of operations has been performed correctly, the ATF timing generator 203 outputs an ATF END signal which is supplied as an enable clear signal to the sync detector circuit 202 and back to the ATF timing generator 203 via the OR gate 216. The ATF END signal is also passed through the OR gate 217 to be supplied to the sync detector circuit 202 as a window off signal, in response to which the window for sync detection by the circuit 202 disappears to as to stop the operation of detecting the pattern of sync signals.

In the case of erroneous sampling, that is, if it is found that the level of the pilot signal on the current track has been sampled-and-yield by the S/H circuit 103, with the level of the output from the comparator 107 being low, or if the number of sync signals detected is below a specified value, both the error detection signal and the Q output of the latch 210 are brought to a high level so that the protective counter 211 performs a counting operation while the error detection counter 214 counts down by "1". When the level of the error detection signal becomes high, the enable clear signal which is sent through the OR gate 216 to the sync detector circuit 202 an the ATF timing generator 203 is again brought to a high level. When the level of the enable clear signal becomes high, the sync detector circuit 203 restarts the sync detection operation and if a predetermined number of sync signals have been detected, the circuit 203 outputs another sampling signal SP1. At the same time, the ATF timing generator 203 sets the sync detection counter and timer to its initial state. If the sync detector circuit 202 outputs another sampling signal SP1 as mentioned above, the latch 210 is reset and its Q output becomes low so that the protective counter 211 is set to its initial state.

When a specified time (2.5 block periods) has passed after the outputting of one error detection signal (i.e., when the level of the CY output of the protective counter 211 has become high), the enable clear signal that is sent through the OR gate 216 to the sync detector circuit 202 and the ATF timing generator 203 is brought to a high level so as to stop the operation of these components.

The sampling counter 215 counts down by "1" in response to the rising edge of the HSWP (A/B) signal. This is in order to control the tape over a certain length in such a way that if error detection effected in that period exceeds a specified value, the level of the CY output of the error detection counter 214 becomes high, whereupon the Q output of the noise flag latch 213 is brought to a high level so as to inform the sync detection circuit 202 that the tape is noisy.

In response to a window clear signal coming from the timing generator 206, the level of the ATF window off signal supplied to the sync detector circuit 202 through the OR gate 217 becomes high; this provision is made to deal with large dropouts.

FIGS. 4a-4c and 4A-4G are timing charts that show the approximate waveforms of the signals generated in various parts of the digital potion of the system after the initial flag latch 11 is set in a playback mode, with the individual waveforms being keyed to the symbols used in FIG. 2.

Figure 5:
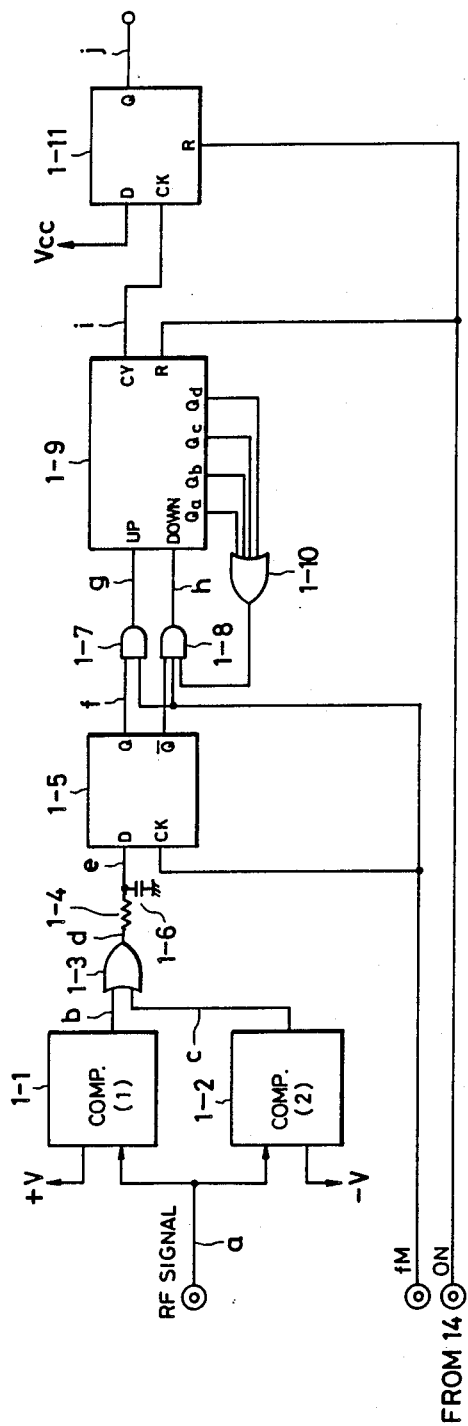
FIG. 5 is a circuit diagram showing a specific configuration of part of the system shown in FIG. 2.

FIG. 5 is a block diagram showing a specific configuration of the head touch detector circuit 201 described on the foregoing pages. In FIG. 5, a comparator 1—1 receives an RF signal at one input, and a reference voltage $+V$ at the other input, and a comparator 1-2 receives the RF signal at one input, and a reference voltage $-V$ at the other input. The outputs of the two comparators are connected to the D input of a D flip-flop (FF) 1-5 through an OR gate 1-3 and a resistor 1-4, and to ground through a capacitor 1-6. The D FF 1-5 receives basic clock $f_m$ at the CK input, and its Q and $\overline{Q}$ outputs are connected to one input of an AND gate 1-7 and one input of an AND gate 1-8, respectively.

A basic clock $f_m$ is fed to the other input of the AND gate 1-7 and to a second input of AND gate 1-8. The output of AND gate 1-7 is connected to the UP input of an up-down counter 1-9, and the output of AND gate 1-8 is connected to the DOWN input of the counter 1-9. The $Q_A$-$Q_D$ outputs of the up-down counter 1-9 are connected to a third input of the AND gate 1-8 through an OR gate 1-10, and the CY output of the counter 1-9 is connected to the CK input of a D FF 1-11. The D input of the D FF 1-11 is connected to Vcc and its Q output provides the output of the touch detector circuit 201.

The R input of each of the up-down counter 1-9 and the D FF 1-11 is fed with the Q output of the head touch window flag latch 14 (FIG. 1).

In the configuration described above, comparator 1—1 produces a high (H) output if the level of the RF signal is higher than $+V$, and produces a low (L) output in the opposite case. Comparator 1-2 produces a high output if the level of the RF signal is lower than $-V$, and produces a low output in the opposite case. Therefore, if the level of the RF signal is not within the range of $\pm V$, the OR gate 1-3 will produce a high output.

The resistor 1-4 and capacitor 1-6 together form an integrator circuit for absorbing any noise such as a noise spike that may be present in the output of the OR gate 1-3. The output of OR gate 1-3 from which any spike noise has been rejected by the integrator circuit is applied to the D input of the D FF 1-5.

The D FF 1-5 samples the state of its D input at the timing determined by the basic clock $f_m$ applied to the CK input, and produces the sampled state at its Q output. The $\overline{Q}$ output of D FF 1-5 is an inverted version of the Q output. The Q output of the D FF 1-5 is applied to one input of the AND gate 1-7 which is fed with the basic clock $f_m$ at the other input. When the Q output of the D FF 1-5 is high, the basic clock $f_m$ is fed with to the UP input of the up-down counter 1-9 via AND gate 1-7. Therefore, the up-down counter 1-9 counts up the basic clock $f_m$ if the Q output of the head touch window flag latch 14 is high (i.e., the window is on) and if the Q output of the D FF 1-5 is high.

If the Q output of the D FF 1-5 is low, that is, if the level of the RF signal is within the range of $\pm V$ indicating that no signal to be reproduced is present, the $\overline{Q}$ output of the D FF 1-5 becomes high. In this state, if any one of the $Q_A$-$Q_D$ outputs of the up-down counter 1-9 is high (i.e., the contents of the counter are not zero), the basic clock $f_m$ is applied to the DOWN input of the counter through the AND gate 1-8 so that the counter will count down. If, as a result of this countdown or resetting, the contents of the counter become zero, with all of the $Q_A$-$Q_D$ outputs being at a low level, the OR gate 1-10 will produce a low output and the AND gate 1-8 is closed so that the basic clock $f_m$ will not be supplied to the DOWN input of the counter 1-9.

If, as a result of countup by the up-down counter 1-9, a carry is produced, the CY output of the counter becomes high. In response to the rising edge of the high CY output, the D FF 1-11 stores the state of its D input. Since the D input is at a high level D FF 1-11 will produce a Q output of high level.

Figure 6:
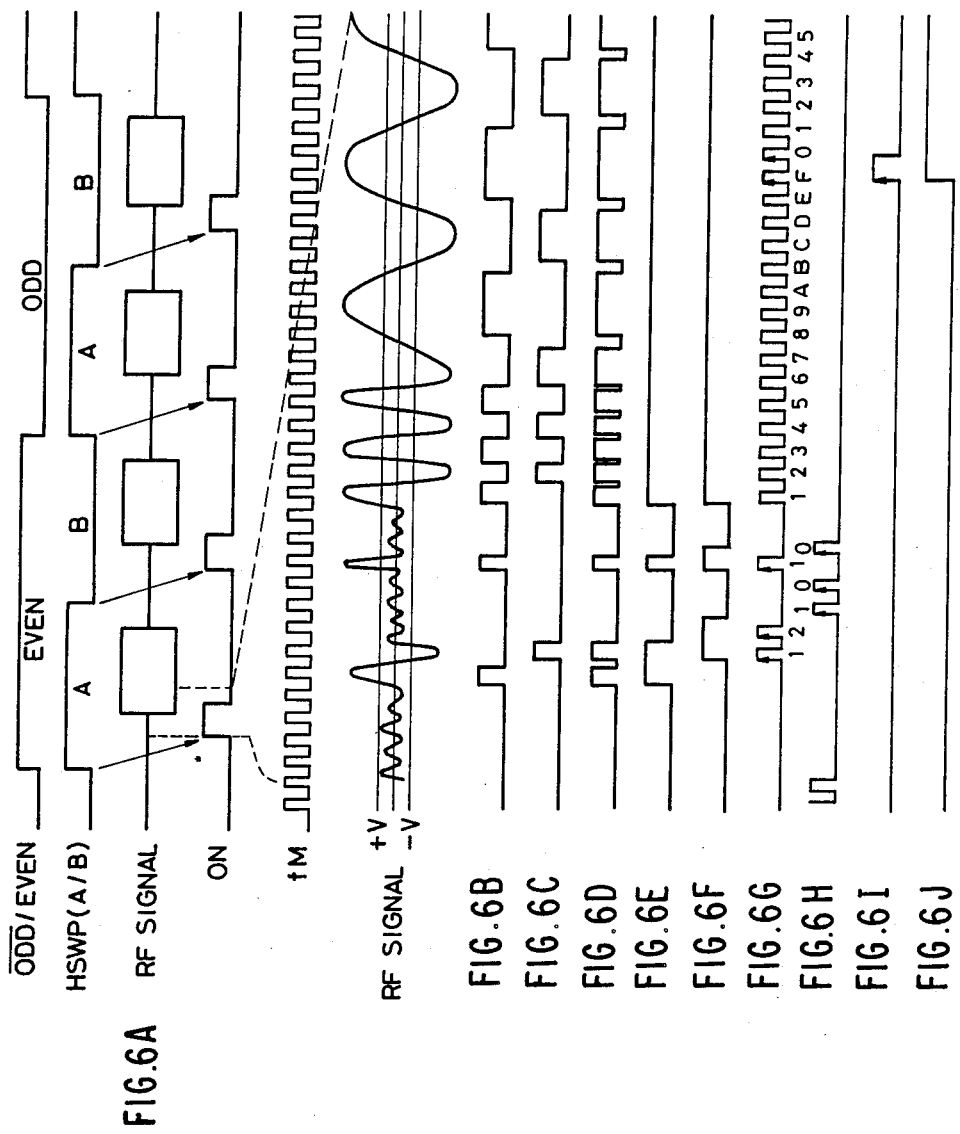
FIGS. 6A–6J are timing charts showing the waveforms of signals generated in various parts of the system shown in FIG. 5.

FIGS. 6B through 6J are timing charts showing the waveforms of signals generated at various parts of the head touch detector circuit shown in FIG. 5 when it is fed with an RF signal having the waveform depicted in FIG. 6A).

In the presence of a signal to be produced, the RF signal continuously provides amplitudes exceeding the range of $\pm V$, whereas in the absence of a signal to be reproduced (i.e., in the area where neither head contacts the tape) the RF signal seldom has amplitudes exceeding the range of $\pm V$. The value of $\pm V$ are set in such a way that they can be clearly distinguished from noise components.

In response to an input RF signal having the waveform shown in FIG. 6A, the comparator 1—1 will produce an output having the waveform shown in FIG. 6B and the comparator 1-2 produces an output having the waveform shown in FIG. 6C. The OR gate 1-3 will produce an output having the waveform shown in FIG. 6D which is the logical sum of 6B and 6C. As is clear from FIG. 6D, the output of the gate 1-3 is incompletely gated and any undesired portions of this output are eliminated by the integrator circuit such that the D input of the D FF 1-5 is fed with a signal having the waveform shown in FIG. 6E.

As a result, a signal having the waveform shown in FIG. 6F appears at the Q output of the D FF 1-5. Since the basic clock $f_m$ passes through the AND gate 1-7 as long as the Q output remains high, and AND gate 1-7 will output a signal having the waveform depicted in FIG. 6G. A signal having the waveform depicted in FIG. 6H will appear at the output of the AND gate 1-8.

Any noise component that slightly exceeds the range of ±V and any incompletely gated portions can be rejected by the integrator circuit but a noise impulse having a large amplitude cannot be rejected by this circuit.

Signals having the waveforms shown in FIGS. 6G and 6H are applied to the UP and DOWN inputs, respectively, of the up-down counter 1-9. When a predetermined number of counts are attained, the up-down counter 1-9 will produce a carry having the waveform depicted in FIG. 6I which is sent to the CY output. In response to this event, the D FF 1-11 will store the state of its D input and produce a signal at the Q output which rises as shown in FIG. 6J.

In the manner described above, any small noise or incomplete gating can be eliminated by the integrator circuit, whereas any large noise can be rejected by the up-down counter 1-9 which achieves control of the duration of time. This provides a clear-cut distinction between the case where a signal is actually reproduced because of contact between tape and head and the case where no signal is reproduced in the absence of tape-to-head contact. In other words, head touch detection can be accomplished in a precise manner.

Figure 7:
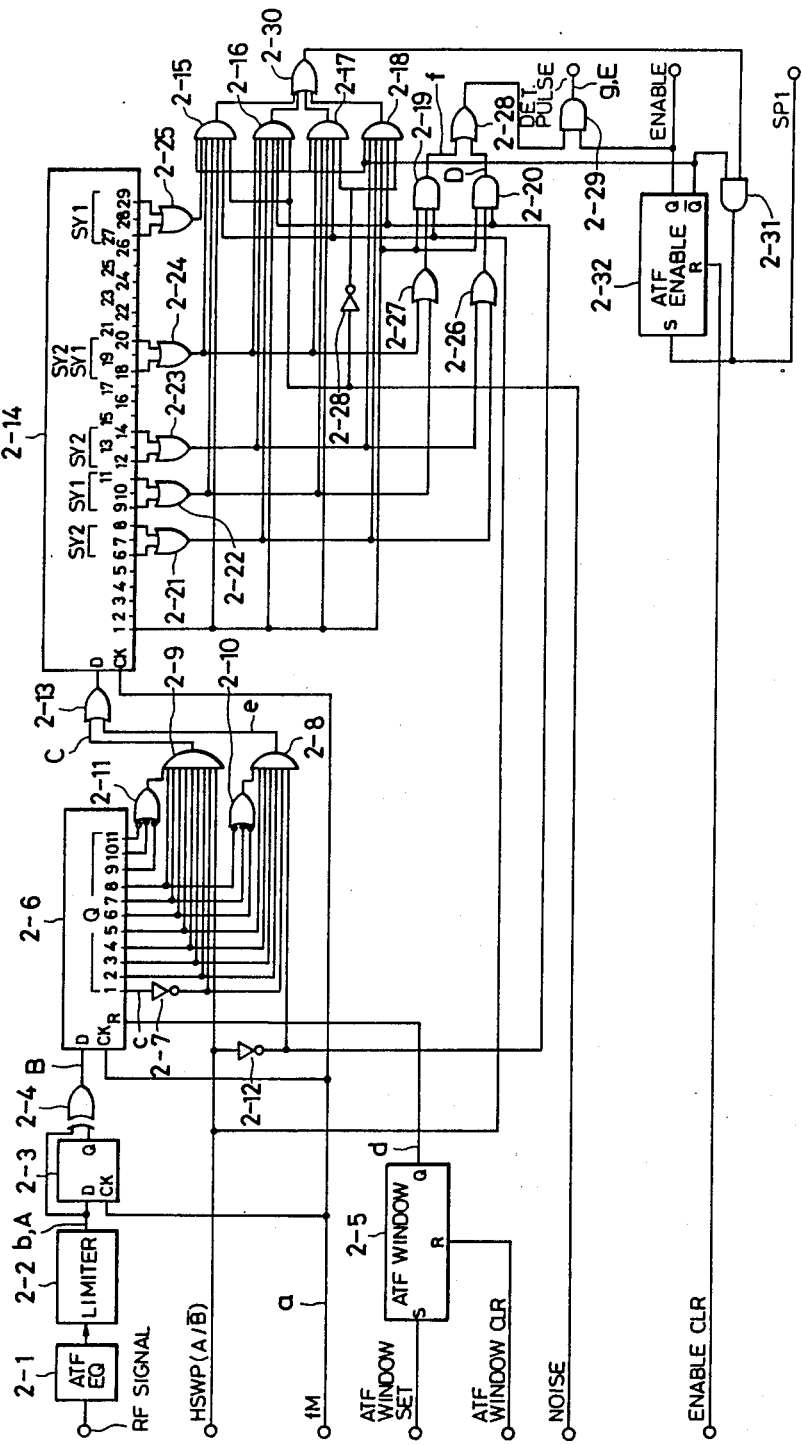
FIG. 7 is a block diagram showing a specific configuration of another part of the system shown in FIG. 2.

FIG. 7 shows a specific configuration of the sync detector circuit 202. The sync detector circuit 202 receives at its inputs an RF signal HSWP (A/B) signal, basic clock $f_m$, ATF window set signal, ATF window clear signal, noise signal and an enable clear signal.

An ATF equalizer 2-1 that is supplied with an RF signal from the reproduction amplifier 15 (FIG. 1) emphasizes the frequency band of the ATF sync signal (400-900 kHz) and sends the thus processed RF signal to a limiter 2—2. In the limiter 2—2, the RF signal is converted to a digital signal which is high (H) if the amplitude of the input signal is greater than a specified level, and is low (L) in the opposite case.

The output of the limiter 2—2 is supplied both to the D input of a D FF 2-3 which is fed with the basic clock $f_m$ at its CK input and to one input of an EXCLUSIVE (E) OR gate 2-4. The other input of EOR gate 2-4 is fed with the Q output of the D FF 2-3 so that the combination of EOR gate 2-4 and D FF 2-3 will constitute a phase inversion detector circuit.

The ATF window set signal is supplied to the S input of an ATF window latch 2-5 that is fed with an ATF window clear signal at its R input, and an ATF window signal is produced from the Q output of the ATF window latch 2-5.

The output of the EOR gate 2-4 is supplied to the D input of a 11-stage shift register 2-6 that is fed with the basic clock $f_m$ and the ATF window signal from the latch 2-5 at its CK and R inputs, respectively. The Q1 output of the shift register 2-6 is supplied to AND gates 2-8 and 2-9 through an inverter 2-7; the Q2-Q5 outputs of the register are supplied to AND gates 2-8 and 2-9; the Q6-Q8 outputs are supplied to a NOR gate 2-10 and the AND gate 2-9; and the Q9-Q11 outputs are supplied to a NOR gate 2-11. The outputs of NOR gates 2-10 and 2-11 are supplied to AND gates 2-8 and 2-9, respectively. The AND gate 2-8 is also fed with an HSWP (A/B) signal that has been inverted by an inverter 2-12, whereas the AND gate 2-9 is fed with an uninverted HSWP (A/B) signal. The outputs of AND gates 2-8 and 2-9 are supplied to the two inputs of an OR gate 2-13.

The output of the OR gate 2-13 is supplied to the D input of a 29-stage shift register 2-14 that is fed with the basic clock $f_m$ at its CK input. The Q1 of the shift register 2-is supplied to the input of each of AND gates 2-15 and 2-20; the Q6-Q8 output of the shift register which will become high upon reception of a sync 2 signal are supplied to the inputs of an OR gate 2-12; the Q9-Q11 outputs which will become high upon reception of a sync 1 signal are supplied to the inputs of an OR gate 2-22; the Q12-Q14 outputs which will become high upon reception of a sync 2 signal are supplied to the inputs of an OR gate 2-23; the Q10-Q20 outputs which will become high upon reception of sync 1 and 2 signals are supplied to the inputs of an OR gate 2-24; and the Q27-Q29 outputs which will become high upon reception of a sync 1 signal are supplied to the inputs of an OR gate 2-25.

The output of OR gate 2-21 is supplied to the inputs of AND gates 2-16 and 2-18 and to the input of OR gate 2-26; the output of OR gate 2-22 is supplied to the inputs of AND gates 2-15 and 2-17 and to the input of OR gate 2-27; the output of OR gate 2-23 is supplied to the inputs of AND gates 2-16 and 2-18 and to the input of AND gate 2-26; the output of OR gate 2-24 is supplied to the inputs of AND gates 2-15 to 2-18 and to the input of OR gate 2-27; and the output of OR gate 2-25 is supplied to the input of AND gate 2-15. The outputs of OR gates 2-26 and 2-27 are supplied to the inputs of AND gates 2-20 and 2-19, respectively.

The AND gates 2-15, 2-17 and 2-19 are supplied with an HSWP (A/B) signal, whereas AND gates 2-16, 2-18 and 2-20 are supplied with an HSWP (A/B) signal that has been inverted by the inverter 2-12. The AND gates 2-15 and 2-16 are also fed with a noisy signal, whereas the AND gates 2-17 and 2-18 are also fed with a noisy signal that has been inverted by an inverter 2-28.

The outputs of AND gates 2-19 and 2-20 are supplied to an OR gate 2-28, and the output of the OR gate 2-28 is supplied to an AND gate 2-29 from which it is sent out as a detection pulse signal. The outputs of AND gates 2-15 to 2-18 are applied to an OR gate 2-30, and the output of OR gate 2-30 is fed to an AND gate 2-31 from which it is sent out as a sampling signal SP1 and forwarded to the S input of an ATF enable latch 2-32 which is fed with an enable clear signal at the R input. The Q output of the ATF enable latch 2-32 is both sent out as an enable signal and supplied to the input of AND gate 2-29. The Q output of the latch 2-32 is supplied to the inputs of AND gates 2-15 to 2-18 and 2-31 so as to control their gating operation.

The sync detector 202 with the foregoing configuration operates as follows. The limiter 2—2 outputs a digital signal that corresponds to ATF sync 1 and sync 2 in the RF signal, and in accordance with the phase inversion of this digital signal, one clock period of the output of EOR gate 2-4 will become low (L). Shift register 2-6 which receives the output of EOR gate 2-4 at the D input will pick up the contents of this D input in response to the rising edge of the basic clock $f_m$ which is applied to the CK input when the window signal that is supplied to the R input from the ATF window latch 2-5 is at a high level, and the picked up input is sent to the Q1 output. Upon each subsequent rising of the basic clock $f_m$, the D input is shifted in successive stages and sent to the Q2-Q11 outputs. In other words, the shift register 2-6 delays the output of EOR gate 2-4 by 1-11 clock periods before it is sent to the Q1-Q11 outputs.

When the Q1 output is at a low level (indicating a change in its level, it is applied to AND gates 2-8 and 2-9 through inverter 2-7. When any one of the Q6-Q8 outputs has become low in level, it is passed through a AND gate 2-10 to provide one high (H) input for the AND gate 2-8. The Q2-Q5 outputs are high unless there is a change in its level. If, in this instance, the HSWP (A/B) signal is low, it is inverted by inverter 2-12 to apply a high input to the AND gate 2-8.

If the conditions described above are met, all the inputs to AND gate 2-8 are high, producing a high output. Therefore, if these conditions are not met, the output of AND gate 2-8 remains low and will not change during a minimum of 4 clock periods. Instead, the output will change during 5-7 clock periods and half the period of sync 2 signal for the case where the HSWP (A/B) is low and reproduction is effected by B head 1B is detected. In practice, the sync 2 signal has a frequency of $F_3$ ($=784$ kHz$=f_m/12$), so the duration of time during which no change occurs in the output of AND gate 2-8 is equivalent to six clock periods but in consideration of such factors as the timing of clock pulses and jitter, a margin of $\pm 1$ clock period is allowed.

The AND gate 2-8 outputs a pulse that becomes low in level for one clock period at every half of the period of the sync 2 signal. Being processed as in the case of sync 2, the sync 1 signal having a frequency of $f_2$ ($=520$ kHz$= f_m/18$) is detected from the output of AND gate 2-9 if the HSWP (A/B) signal is high (i.e., reproduction is effected by A head 1A). In this case, the output of AND gate 2-9 will remain unchanged for seven clock periods and changes in state during clock period 8-10.

The sync 2 signal is produced from the AND gate 2-8 when the HSWP (A/B) signal is low, and the sync 1 signal is produced from the AND gate 2-9 when the HSWP (A/B) signal is high. Each of these sync signals is passed through the OR gate 2-134 and fed to the D input of the shift register 2-14.

The 29-stage shift register 2-14 stores the state of its D input in response to the rising edge of an input clock signal and sends the memory to the Q1 output. Upon every application of a clock in subsequent stages, the memory is shifted and sent to Q2-Q29 outputs. Therefore, the state of the D input produced at the Q1-Q29 outputs has been delayed by 1-29 clock periods.

When there is a change in the Q1 output of shift register 2-14, the level of this output becomes high. If, in the case of detection of sync 2 signal (f₃780 kHz$=1/12$ $f_M$), there occurs a change one half period before the Q1 output, the OR gate 2-21 produces a high output. If there occurs a change one period after the Q1 output, the OR gate 2-23 will produce a high output. Therefore, output of OR gate 2-26 becomes high if there is a change one half period and/or one period before the Q1 output. The output of OR gate 2-26 becomes high if there is a change one half period and/or one period before the Q1 output. The output of OR gate 2-26 is applied to the input of AND gate 2-20 together with the Q1 output of the shift register 2-14 and the HSWP (A/B) signal. The foregoing explanation can be summarized as follows: in the case of detection of sync 2, the Q1 output becomes high when the D input is delayed by one clock period after detection of sync 2 by AND gate 2-8, and if the change that has occurred one half period before Q1 output and the change that has occurred one period before Q1 output are applied simultaneously to the input of AND gate 2-20 (the first change is passed through OR gates 2-21 and 2-26 whereas the second change is passed through OR gates 2-23 and 2-26), the output of AND gate 2-20 becomes high so as to produce a high output from OR gate 2-28.

The outputs of OR gates 2-21, 2-23 and 2-24 connected to the output of 29-stage shift register 2-14 become high when sync 2 is detected, therefore, when the noisy signal is at a low level, the output of AND gate 2-18 becomes high and is passed through OR gate 2-30 and AND gate 2-31, from which it is produced as a sampling signal SP1; at the same time, the output from AND gate 2-31 is applied to the S input of ATF enable latch 2-32 so that its Q output becomes high while the Q output becomes low. The Q output of latch 2-32 not only serves as an enable signal; it is also applied to AND gate 2-29 which then produces a detection pulse signal as its output.

Also referring to the case of detection of sync 2, if the noise signal is high, the output of AND gate 2-16 becomes high and the same operations as described above will proceed.

In the case of detection of sync 1, the outputs of OR gates 2-22, 2-24 and 2-25 become high; if the noise signal is at a low level, the output of AND gate 2-17 becomes high, and if the noise signal is at a high level, the output of AND gate 2-15 becomes high. The operations that follow are the same as described in the previous paragraphs.

In short, decision of sync detection is made at either 3 or 4 points depending upon the level of the noisy signal.

FIGS. 8a-8g are timing charts showing the waveforms of the signals that are generated in various parts of the system when detecting sync 2, with the individual waveforms being keyed to the symbols used in FIG. 7.

FIGS. 9A-9E are also timing charts showing the waveforms of the signals that are generated in various parts of the system when detecting sync 1, with the individual waveforms being keyed to the symbols used in FIG. 7.

Figure 10:
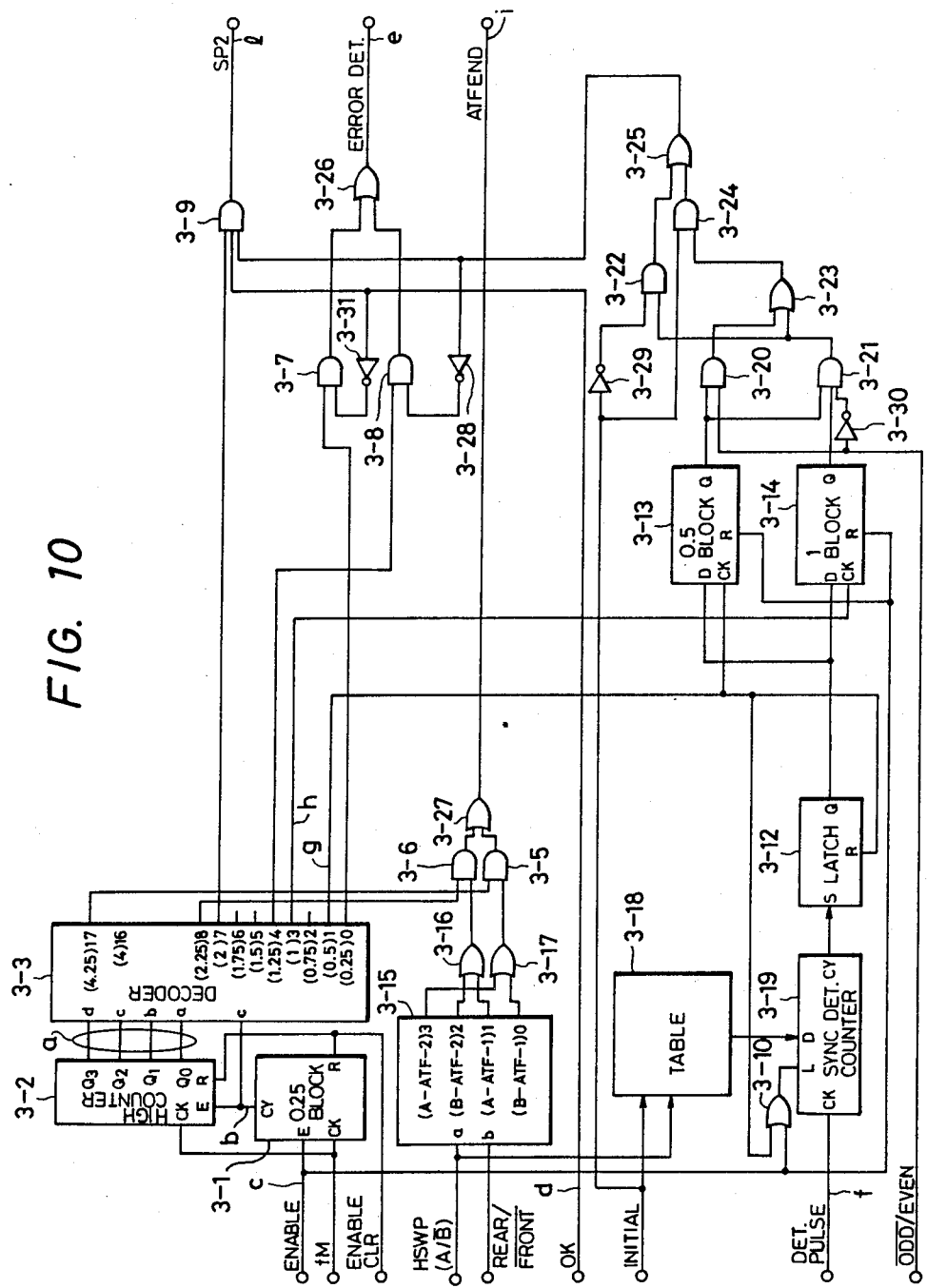
FIG. 10 is a circuit diagram showing a specific configuration of still another part of the system shown in FIG. 2.
Figure 11:
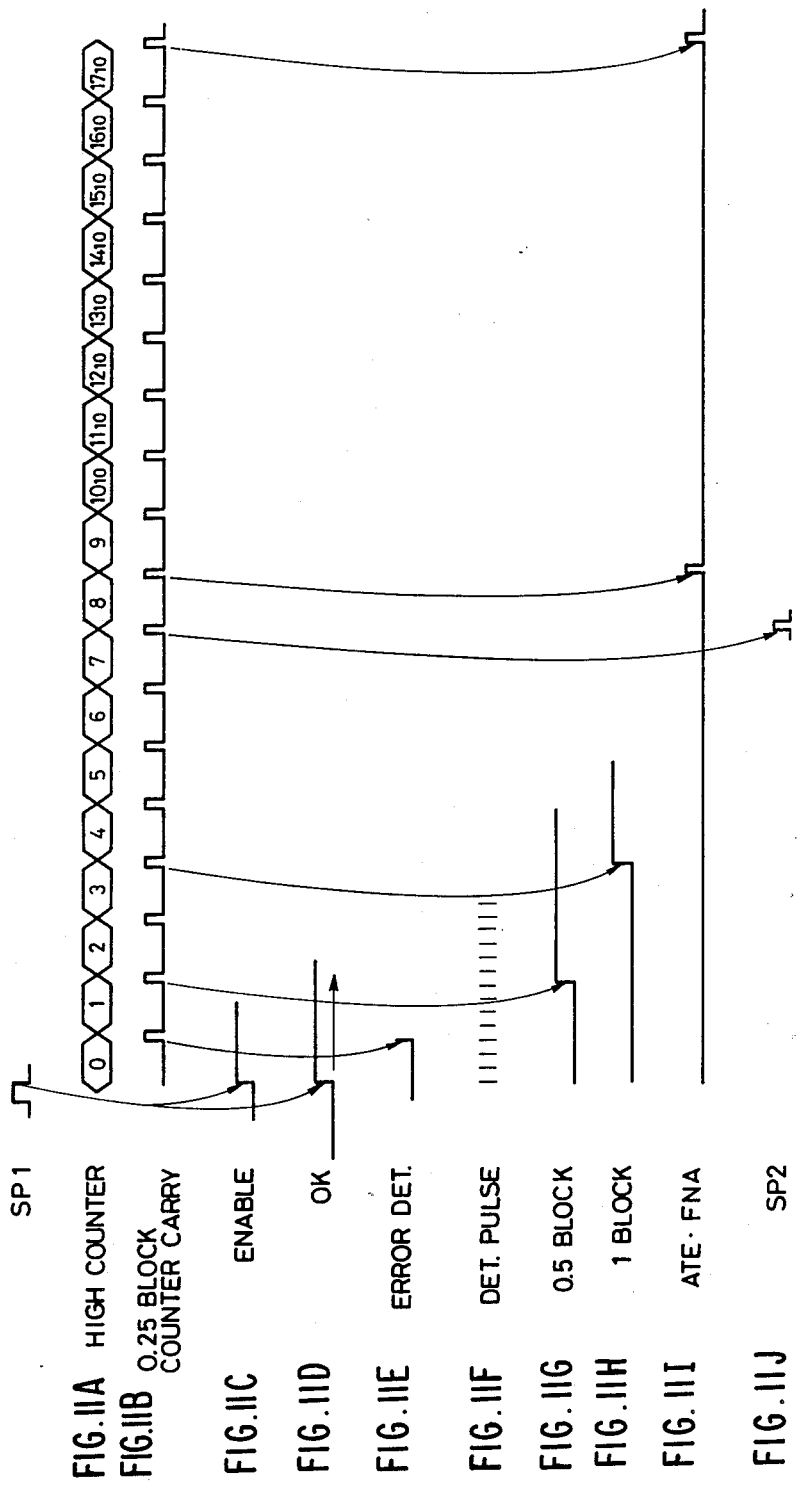
FIGS. 11A–11J are timing charts showing the waveforms of signals generated in various parts of the system shown in FIG. 10.

FIG. 10 shows a specific configuration of the ATF timing generator 203. The generator 203 is fed at its inputs with an ODD/EVEN signal, a basic clock $f_m$, and HSWP (A/B) signal, an enable signal, an enable clear signal, a rear/front signal, an OK signal, an initial signal, and a pulse detection signal.

As shown in FIG. 10, a 0.25-block counter 3-1 receives an enable signal, a basic clock $f_m$ and an enable clear signal at the E, CK and R inputs, respectively. After counting 0.25 blocks equivalent to 9.5 μs, the CY output of the counter 3-1 becomes high and is fed both to the E input of a high counter 3-2 and to the C input of a decoder 3—3.

The high counter 3-2 receives a basic clock $f_m$ and an enable clear signal at the CK and R inputs, respectively, and counts up after each 0.25 blocks. The Q0-Q4 ($2^0$-$2^4$) outputs of the counter 3-2 are fed into the decoder 3—3.

The decoder 3—3 decodes each of the timing signals it receives. Only when the C input is high do 0-8, 16 and 17 outputs becomes active and the 0-8 outputs will produce 0.25-2.25 block signals at intervals of 0.25 blocks while the 16 and 17 outputs produce 4- and 4.25-block signals, respectively.

The outputs of decoder 3—3 are fed into gates 3-5 to 3-10 and the 0.5-block signal is supplied both to the R input of a latch 3-12 and to the CK input of a D FF 3-13 while the 1-block signal is supplied to the CK input of a D FF 3-14.

A decoder 3-15 receives an HSWP (A/B) signal and a rear/front signal at its inputs and decodes the location of an ATF signal presently being reproduced. It produces B-ATF-1, A-ATF-1, B-ATF-2 and A-ATF-2 signals at the 0-3 outputs, respectively, which are supplied to gates 3-16 and 3-17.

A table 3-18 is fed with an HSWP (A/B) signal and an initial signal at its inputs, and in response to these signals it changes the present threshold value it has for sync detection and sets the appropriate value in a sync detection counter 3-19. Depending upon the HSWP (A/B) value, one of the two threshold values is set, one being for detection of sync 1 when reproduction is conducted with head A and the other being for detection of sync 2 when head B is in action. Each of the two threshold values occupies 50% of the number of consecutive sync patterns, provided that it occupies 60% of the number of consecutive sync 2 patterns when the initial signal is at a low level. The sync detection counter 3-19 counts the number of pulse detection signals and its CY output is supplied to the S input of a latch 3-12.

The other components of the ATF timing generator 203 are gates 3-20 to 3-27 and inverters 3-28 to 3-30.

The sampling signal SP2 appears at the output of gate 3-9; an error detection signal at the output of gate 3-26; and ATF END signal at the output of gate 3-27.

The ATF timing generator with the foregoing configuration will operate in the following manner. When the sync detector circuit 202 generates a sampling signal SP1, the 0.25-block counter 3-1 starts a counting operation in response to an enable signal and an OK signal, both becoming high in coincidence with the falling edge of SP1. The CY output of the counter 3-1 becomes high at intervals of 0.25 blocks. Decoder 3-1 decodes the state of high counter 3-2 and produces a high output only when the CY output of the counter 3-1 is high.

When the 0 output of decoder 3—3 appears (i.e., 0.25 blocks after the generation of a sampling signal SP1), the OK signal is at a high level if the sampled value of crosstalk level on an adjacent track is less than a predetermined level. Therefore, the 0 output of decoder 3—3 will not appear at the output of AND gate 3-7 which is fed with the OK signal via inverter 3—31. When the OK signal is at a low level, AND gate 3-7 will produce a high (H) output which is sent to OR gate 3-26 and delivered therefrom as an error detection signal.

When the 1 output of decoder 3—3 becomes high, the processing performed after 0.5 block periods consists of applying this high output to the L input of sync detection counter 3-19 via OR gate 3-10, as well as to the R input of latch 3-12 and to the OK input of D FF 3-13.

The D input of D FF 3-13 is fed with the CY output of sync detection counter 3-19 via latch 3-12, so after 0.5 block periods sampling is conducted by D FF 3-13 to see if the number of detection pulse signals generated exceeds a specified value. At the same time, latch 3-12 is reset and the table 3-18 sets an appropriate threshold value again in the sync detection counter 3-19.

When the 3 output of decoder 3—3 is high, the necessary processing is conducted after one block period and a D FF 3-14 which is fed at the D input with the CY output of sync detection counter 3-19 via latch 3-12 performs sampling to see if a specified number of pulses have been detected in one block period.

The combination circuit of gates 3-20, 3-21, 3-23 and inverter 3-30 determines whether a specified number of detection pulse signals have been generated based on an ODD/EVEN signal. If the Q outputs of both D FF 3-14 and 3-14 are at a high level in the case of application of an ODD signal, and if the Q output of D FF 3-13 is high in the case of application of an EVEN signal, it is concluded that a specified number of detection pulse signals have been generated and the output of OR gate 3-25 becomes high.

If the same processing is performed with the initial signal having a high level, OR gate 3-25 produces a high output via inverter 3-29 and AND gate 3-22

If the sync detection counter 3-19 fails to detect a specified number of pulse signals, OR gate 3-25 will produce a low (L) output. Therefore, if a specified number of detection pulse signals have not been detected after 1.25 block periods (i.e., the 4 output of decoder 3—3 is at a high level), OR gate 3-26 will produce a high (H) error detection signal via inverter 3-28 and AND gate 3-8.

If the 7 output of decoder 3—3 is high (i.e., after 2 block periods), the generation of a specified number of detection pulse signals and the application of an OK signal will allow a sampling signal SP2 to be produced at the output of AND gate 3-9 for effecting sampling for the other adjacent track.

If the 17 output of decoder 3—3 is high and if ATF-2 is scanned with head A while ATF-1 is scanned with head B, the generator 2-3 produces an ATF END signal via gates 3-17, 3-5 and 3-27. If the 8 output of decoder 3—3 becomes high when ATF-1 is scanned with head A while ATF-2 is scanned with head B, the decoder 3-15 will produce an ATF END signal via gates 3-16, 3-6 and 3-27.

FIGS. 11A-11J show the waveforms of the signals generated at various parts of the system during the operations described above, with the individual waveforms being keyed to the symbols attached to the respective parts.

In the above-described embodiment, comparison of the signal level which has been sampled and held in the S/H circuit 103 with a predetermined level is performed in the comparator 107 in response to the sampling signal SP1 fed from the sync detector circuit 202, and the resultant signal which is referred to as an OK signal is applied to one input of ATF timing generator 203, to thereby control the output of the sampling signal SP2 in the AND gate 3-9. Stated another way, it is determined if the difference between the signal level which has been sampled and held in response to the sampling signal SP1 and the level of a signal coming two blocks after from that sampling and holding should be sampled and held in the S/H circuit as the ATF error signal. When the signal level which has been sampled and held in response to the sampling signal is extraordinarily large, it is determined so that level is not a crosstalk of the pilot signal of one adjacent track whose level is adequate. And, it is contemplated not to produce the ATF error signal based on that extraordinary signal to thereby prevent tracking from being disturbed.

It should be noted that the circuit configuration for preventing the disturbance of the tracking is not limited to that described above but various modifications are possible as will be described hereinafter.

Figure 12:
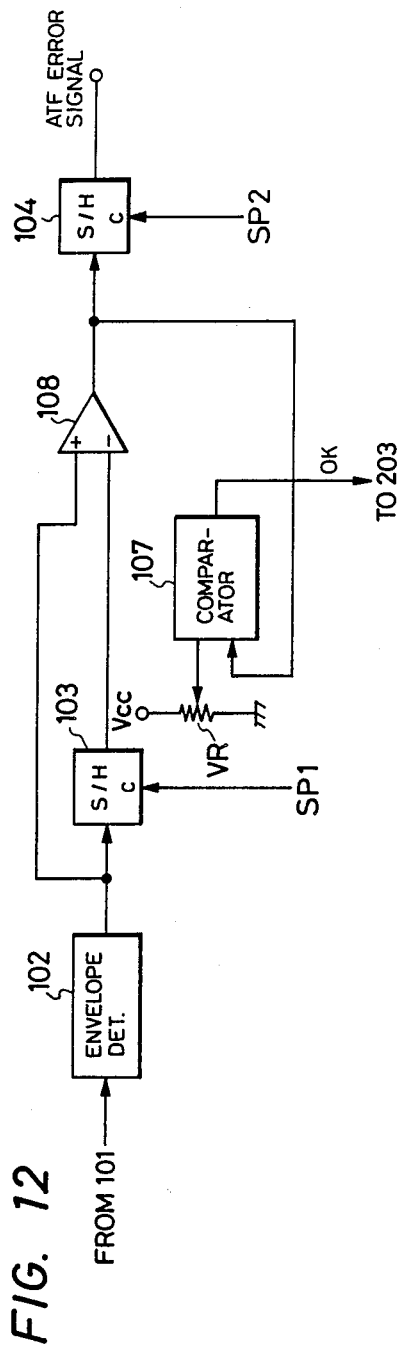
FIGS. 12 and 13 are circuit diagrams showing partial modifications of the system shown in FIG. 2.

FIG. 12 is a circuit diagram showing one such modification in which the comparator 107 compares the output of the differential amplifier 108 with a predetermined level, whereupon the OK signal is outputted from the ATF timing generator 203. This modification is derived from the fact that the difference in level between the sampled and held signal in the S/H circuit and the signal coming two blocks after the former signal becomes extraordinary if the level of the former signal is extraordinary. Similar effects can be obtained from this modification to those obtained from the FIG. 2 circuit.

Figure 13:
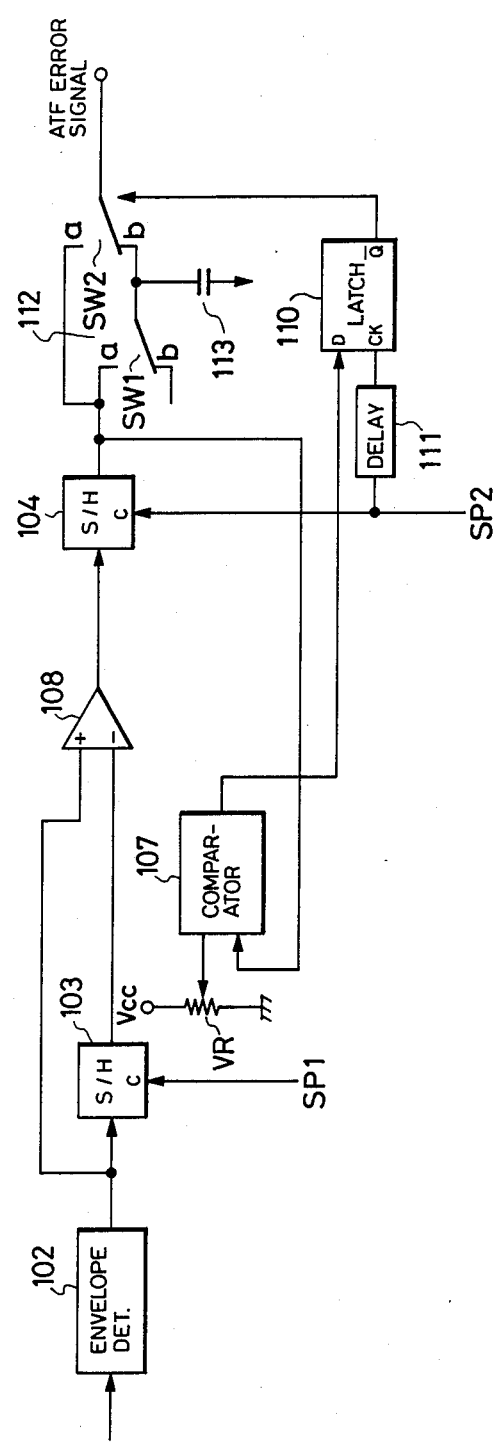
Figure 15:
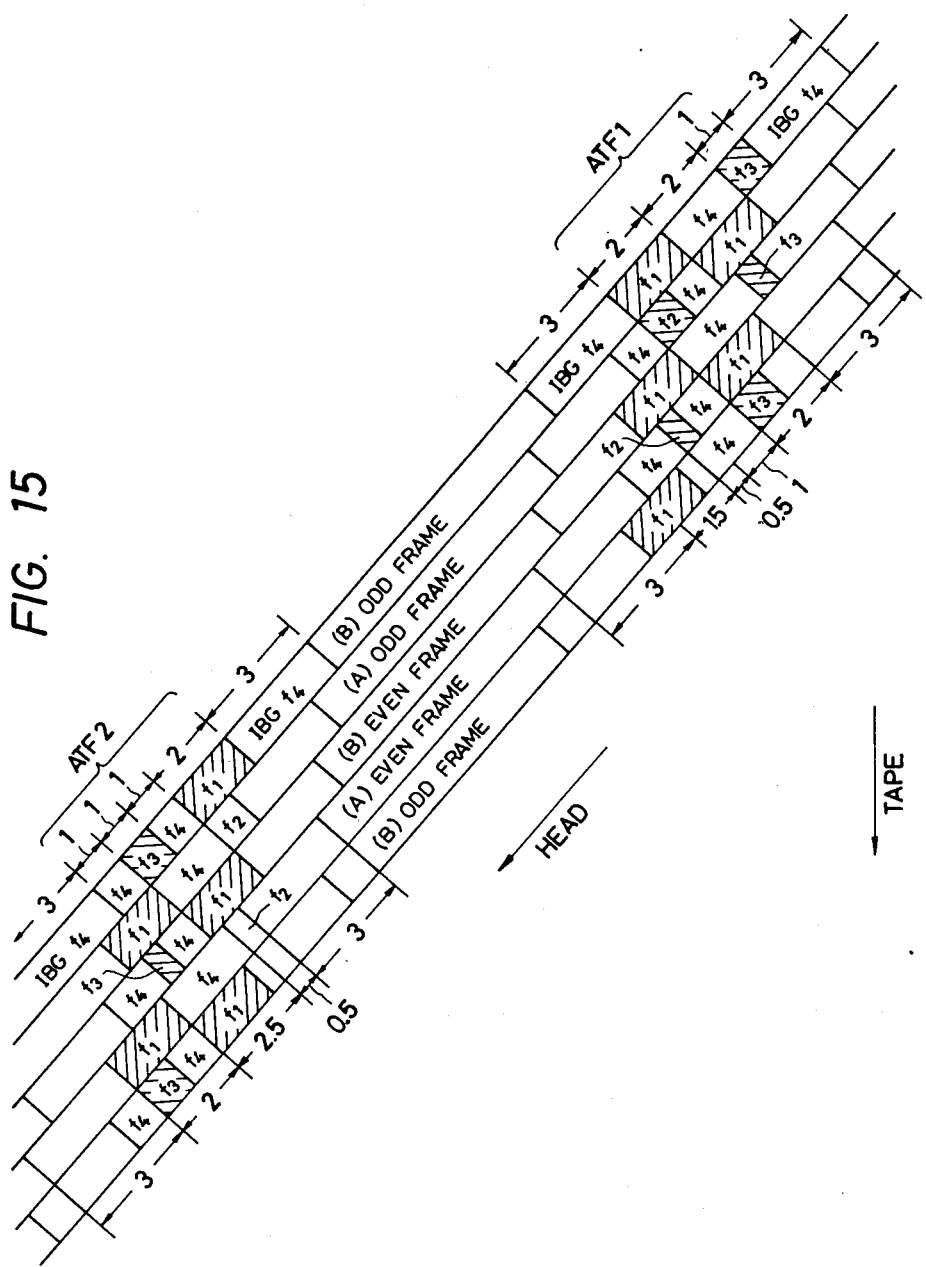
FIG. 15 is a diagram showing an ATF track pattern used n R-DAT.

FIG. 13 is also a circuit diagram showing another modification. The comparator 107 compares the output of the S/H circuit 104 with a predetermined level, and the resultant signal is applied to the D input of the latch circuit 110. The latch circuit 110 maintains the signal state on the D input at the time when the sampling signal, which is delayed by a certain period of time by passing through the delay circuit 111, is applied to the OK input and is sent to Q output. The Q output is utilized as a control signal for the switch circuit 112. The switch circuit 112 includes two switches SW1 and SW2 which are ganged with each other. The a contacts of the switches SW1 and SW2 are connected to the output of the S/H circuit 104. The common contact of the switch SW1 and the b contact of the switch SW2 are connected to one terminal of the capacitor 113 whose other terminal is grounded. The ATF error signal is outputted from the common contact of the switch SW2.

In the circuit of FIG. 13, when the level difference which has been sampled and held in the S/H circuit 104 is normal, the switches SW1 and SW2 in the switch circuit 112 are switched to the a contact sides, thereby permitting the output of the S/H circuit 104 to output as the ATF error signal and charging the capacitor 113. When the level difference becomes extraordinary, the switches SW1 and SW2 are switched to b contact sides so as not to output the extraordinary level difference as the ATF error signal. Instead, the level having been held in the capacitor 113 is outputted as the ATF error signal.

The same effects can be achieved by the provision of another S/H circuit in place of the capacitor, in which the same level difference having been sampled and held in the S/H circuit 104 is sampled and held.

As described, in accordance with the present invention, it is decided if the level sampled in response to the sync signal is appropriate, and the control of the capstan servo is not performed if the level difference is inappropriate caused by inappropriate crosstalk level difference. Therefore, the disturbance of the capstan servo can be prevented.

Further, in accordance with present invention, since the detection of the sync signal ceases when the level of the pilot signal frequency components in the output signals of the respective rotary heads are not in a particular relationship with respect to a predetermined level, the pilot signal of the current track is not erroneously detected in response to the inerased sync signal, and so the capstan servo control is not effected so as not to cause disturbance of the capstan servo.

I claim:

1. A digital signal reproducing apparatus having at least two rotary heads for reproducing a plurality of signals on a recording medium, said plurality of signals containing digital signals, a tracking pilot signal composed of a low-frequency signal, and a sync signal, wherein said plurality of signals are recorded on each of a plurality of helical tracks in a predetermined format with a recording region in one track being independent of a recording region in another track along a longitudinal direction, positions of the pilot signals recorded on three consecutive tracks differ from one track to another, and different sync signals are recorded in different respective positions on adjacent tracks, each of said rotary heads has a width greater than the width of each track, and upon obtaining amounts of crosstalk between pilot signals of a current track and of two tracks adjacent to the current track being reproduced, said crosstalk amounts being provided at outputs of the respective rotary heads by scanning each of the tracks, a capstan servo is controlled in accordance with a difference between the amounts of crosstalk of the pilot signals that are picked up by said rotary heads from the two tracks adjacent to the current track being reproduced, the improvement comprising:

means for detecting a sync signal;

means for sampling, from output signals of said rotary heads, levels of frequency components of said pilot signals and holding said levels in response to said sync signal detected by said sync detection means;

means for comparing said levels being held in said sampling and holding means with a predetermined level; and means for deciding whether a difference in level between a level being held in said sampling and holding means and levels of the pilot signal frequency components in the output signals of the respective rotary heads reproduced after a predetermined period of time from the detection of said sync signal by said sync detection means is supplied to said capstan servo as a signal representative of an amount of track deviation.

2. A digital signal reproducing apparatus according to claim 1 wherein said level comparing means comprises a variable gain circuit the gain of which with respect to the difference between crosstalk levels of pilot signals from the two adjacent tracks is controlled in proportion to a level of the pilot signal on the current track.

3. A digital signal reproducing apparatus according to claim 1 wherein said level comparing means is composed of a divider circuit which performs a division with a level of the pilot signal on the current track serving as denominator and the difference between crosstalk levels of pilot signals from the two adjacent tracks serving as a numerator when the level of the pilot signal on the current track and the levels of crosstalk of the pilot signals are high, otherwise a level of the pilot signal of another track is employed as denominator.

4. A digital signal reproducing apparatus having at least two rotary heads for reproducing a plurality of signals on a recording medium, said plurality of signals containing digital signals, a tracking pilot signal composed of a low-frequency signal, and a sync signal, wherein said plurality of signals are recorded on each of a plurality of helical tracks in a predetermined format with a recording region in one track being independent of a recording region in another track along a longitudinal direction, positions of the pilot signals recorded on three consecutive tracks differ from one track to another, and different sync signals are recorded in different respective positions on adjacent tracks, each of said rotary heads has a width greater than the width of each track, and upon obtaining amounts of crosstalk between pilot signals of a current track and of two tracks adjacent to the current track being reproduced, said crosstalk amounts being provided at outputs of the respective rotary heads by scanning each of the tracks, a capstan servo is controlled in accordance with a difference between the amounts of crosstalk of the pilot signals that are picked up by said rotary heads from the two tracks adjacent to the current track being reproduced, the improvement comprising:

means for detecting a sync signal;

means for sampling, from output signals of said rotary heads, levels of frequency components of said pilot signals and holding said levels in response to said sync signal detected by said sync detection means;

means for computing a difference in level between a level being held in said sampling and holding means and levels of the pilot signal frequency components in the output signals of the respective rotary heads reproduced after a predetermined period of time from the detection of said sync signal by said sync detection means;

means for judging whether the levels of the pilot signal frequency components in the output signals of the respective rotary heads have a particular relationship to a predetermined level; and means for prohibiting the detection of said sync signal when said judging means judges that the levels of the pilot signal frequency components do not have said particular relation therewith.

* * * * *